(12) United States Patent
Ikeda et al.

(10) Patent No.: US 9,028,130 B2
(45) Date of Patent: May 12, 2015

(54) SEAL RING

(75) Inventors: Sadao Ikeda, Toyota (JP); Takashi Nagase, Nisshin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 666 days.

(21) Appl. No.: 13/391,140

(22) PCT Filed: Aug. 18, 2009

(86) PCT No.: PCT/JP2009/064442
§ 371 (c)(1),
(2), (4) Date: Feb. 17, 2012

(87) PCT Pub. No.: WO2011/021273
PCT Pub. Date: Feb. 24, 2011

(65) Prior Publication Data
US 2012/0146292 A1    Jun. 14, 2012

(51) Int. Cl.
B29C 47/64 (2006.01)
B29C 47/40 (2006.01)
B29C 47/08 (2006.01)
B29C 47/38 (2006.01)
B29C 47/60 (2006.01)
B29C 47/62 (2006.01)
B29C 47/00 (2006.01)

(52) U.S. Cl.
CPC ........... B29C 47/402 (2013.01); B29C 47/0009 (2013.01); B29C 47/0871 (2013.01); B29C 47/38 (2013.01); B29C 47/605 (2013.01); B29C 47/627 (2013.01); B29C 47/6043 (2013.01); B29C 47/6056 (2013.01); B29C 47/6068 (2013.01); B29C 47/6075 (2013.01); B29C 47/64 (2013.01); B29C 47/6062 (2013.01)

(58) Field of Classification Search
CPC ................... B29C 47/6056; B29C 47/6062
USPC ............................................. 366/82
See application file for complete search history.

(56) References Cited

U.S. PATENT DOCUMENTS 3,239,882 A * 3/1966 Yokana ........................ 366/82
3,461,497 A * 8/1969 Geyer ........................ 366/82
3,941,535 A * 3/1976 Street ........................ 425/208

(Continued)

FOREIGN PATENT DOCUMENTS

JP    62-25119 A    10/1987
JP    2-32990 U    3/1990

(Continued)

*Primary Examiner* — Tony G Soohoo
(74) *Attorney, Agent, or Firm* — Sughrue Mion, PLLC

(57) ABSTRACT

A seal ring is provided which allows the interior of a cylinder 1 of a screw extruder to be maintained at elevated temperature and elevated pressure, thus suppressing a variation in the pressure in the cylinder 1. In a special seal ring 300 attached to a screw shaft 7 in the cylinder of the screw extruder so as to be rotatable integrally with the screw shaft 7, thus restraining a material to be treated from being fed from upstream to downstream in the cylinder, a lead groove 317 extending in an axial direction of the shaft 7 is formed in an outer circumferential surface 316 opposing with a predetermined gap to an inner circumferential surface 1a of the cylinder. The lead groove 317 serves to disturb the flow of the material to be treated passing between the outer circumferential surface 316 and the inner wall surface 1a of the cylinder 1 to complex the flow. This stabilizes feeding resistance to suppress a variation in the pressure in the cylinder 1.

8 Claims, 28 Drawing Sheets

(56) References Cited

U.S. PATENT DOCUMENTS

| | | | |
|---|---|---|---|
| 5,215,764 A * | 6/1993 | Davis et al. | 425/208 |
| 5,302,106 A * | 4/1994 | Nogossek | 425/204 |
| 5,320,796 A * | 6/1994 | Harashima et al. | 264/349 |
| 5,370,456 A * | 12/1994 | Yamaoka | 366/80 |
| 5,539,004 A | 7/1996 | Ikeda et al. | |
| 5,851,065 A | 12/1998 | Ikeda et al. | |
| 6,048,088 A * | 4/2000 | Haring et al. | 366/85 |
| 6,116,770 A * | 9/2000 | Kiani et al. | 366/82 |
| 6,132,076 A | 10/2000 | Jana et al. | |
| 6,241,375 B1 * | 6/2001 | Wang | 366/82 |
| 7,021,816 B2 * | 4/2006 | Malloy | 366/81 |
| 2001/0031289 A1 * | 10/2001 | Maris | 425/204 |
| 2005/0013192 A1 * | 1/2005 | Kakizaki et al. | 366/82 |
| 2005/0024986 A1 * | 2/2005 | Mattingly, Jr. | 366/82 |
| 2005/0270894 A1 * | 12/2005 | Gates et al. | 366/82 |
| 2007/0177451 A1 * | 8/2007 | Benjamin et al. | 366/82 |
| 2011/0007598 A1 * | 1/2011 | Samann | 366/82 |
| 2012/0146292 A1 * | 6/2012 | Ikeda et al. | 277/586 |

FOREIGN PATENT DOCUMENTS

| | | |
|---|---|---|
| JP | 2-255318 A | 10/1990 |
| JP | 4-146281 A | 5/1992 |
| JP | 7-124945 A | 5/1995 |
| JP | 2909577 B2 | 6/1999 |
| JP | 2001-322155 A | 11/2001 |
| JP | 2002-531298 A | 9/2002 |
| JP | 2004-58271 A | 2/2004 |
| JP | 2004-75928 A | 3/2004 |
| JP | 2007-202518 A | 8/2007 |

* cited by examiner

SEAL RING

CROSS REFERENCE TO RELATED APPLICATIONS

This application is a National Stage of International Application No. PCT/JP2009/064442, filed on Aug. 18, 2009, the contents of all of which are incorporated herein by reference in their entirety.

TECHNICAL FIELD

The present invention relates to a seal ring for use in a screw extruder.

BACKGROUND ART

Patent Document 1 discloses an extruder that allows a screw to feed wood-based biomass chips introduced into a cylinder while subjecting the biomass chips to steam heating.

Patent Document 2 discloses a screw extruder that introduces wood chips into a cylinder and feeds the chips with water added thereto and that shears the chips under pressure and heat and pushes the sheared chips out of the cylinder so that the chips are subjected to bulking to decompose lignin.

Patent Document 3 discloses a double-screw extruder with a double screw including a kneading disc inside a heating barrel with a heater.

Patent Document 1: JP Patent Publication (Kokai) No. 2007-202518A

Patent Document 2: JP Patent Publication (Kokai) No. 4-146281A

Patent Document 3: JP Patent Publication (Kokai) No. 2004-58271A

DISCLOSURE OF THE INVENTION

Problems to be Solved by the Invention

In the technique described in Patent Document 1, a chip introduction portion is provided in an upstream portion of the cylinder to introduce the wood-based biomass chips. Thus, the technique fails to maintain the pressure in the cylinder. Therefore, the technique has difficulty increasing the temperature and pressure in the cylinder and fails to sufficiently decompose the wood-based biomass chips.

In the technique described in Patent Document 2, a backward screw portion provided at a downstream end of the screw hinders pulverulent chips in the cylinder from being fed in order to raise the pressure. However, the use of only the backward screw portion involves a significant variation in pressure in the cylinder and makes maintenance of elevated pressure in the cylinder difficult. Thus, the technique has difficulty maintaining elevated temperature and elevated pressure in the cylinder and fails to sufficiently decompose the wood chips in the cylinder.

Furthermore, in the technique described in Patent Document 3, the kneading disc is provided on the screw. However, the pressure in the cylinder cannot be maintained only by the kneading disc, and the pressure thus varies greatly, hindering uniform treatment conditions from being established. The technique thus fails to sufficiently decompose plant biomass in the cylinder.

The present invention has been developed in view of the above-described problems. An object of the present invention is to provide a seal ring that enables elevated temperature and elevated pressure to be maintained in the cylinder of the screw extruder, thus suppressing a variation in the pressure in the cylinder.

Means for Solving the Problems

To accomplish this object, the present invention provides a seal ring attached to a screw shaft in a cylinder of a screw extruder so as to be rotatable integrally with the screw shaft, thus restraining a material to be treated from being fed from upstream to downstream in the cylinder, the seal ring comprising an outer circumferential surface opposing with a predetermined gap to an inner wall surface of the cylinder and a lead groove formed in the outer circumferential surface and extending in an axial direction of the screw shaft (Claim 1).

According to the seal ring according to the present invention, the lead groove extending in the axial direction of the screw shaft is formed in the outer circumferential surface. This allows the flow of a material to be treated passing between the outer circumferential surface and the inner wall surface of the cylinder to be disturbed and complicated.

Thus, feeding resistance that suppresses the feeding of the material to be treated can be stabilized to maintain the difference in pressure between an upstream side and a downstream side of the seal ring. This enables, for example, maintenance of the pressure in an area formed between a seal ring provided upstream of the cylinder and a seal ring provided downstream of the cylinder. A variation in the pressure in the area can be suppressed to maintain elevated temperature and elevated pressure in the area.

Furthermore, the lead groove allows a part of the material to be treated to be guided to a downstream side of the cylinder while suppressing the feeding of the material to be treated. This enables the upstream side of the seal ring to be prevented from being set to an excessively high pressure, thus preventing aggregates from being generated upstream of the seal ring.

The seal ring according to the present invention preferably comprises a shaft portion with a shaft hole through which the screw shaft is inserted, an expanded diameter portion formed by expanding a diameter of the shaft portion and comprising an outer circumferential surface, and a stepped portion formed by cutting, into a step, an edge portion between the outer circumferential surface and a front surface of the expanded diameter position positioned on an upstream side of the expanded diameter portion in a feeding direction (Claim 2).

The seal ring according to the present invention comprises the stepped portion. This enables a reduction in a compressive force and a frictional force locally applied to the material to be treated by the expanded diameter portion. As a result, the material to be treated can be prevented from becoming denser and stronger early at an outermost portion in a passage in the cylinder, thus preventing aggregates from being generated.

Furthermore, the stepped portion allows the area of the front surface of the expanded diameter portion to be reduced. As a result, a relatively weak compressive force and a relatively weak frictional force may be generated when the material to be treated fed from the upstream side in the feeding direction comes into abutting contact with the front surface of the expanded diameter portion. This enables a reduction in a torque required to rotate the screw shaft, allowing a drive motor to be miniaturized.

The seal ring according to the present invention preferably comprises a recessed portion formed in the outer circumferential surface and which is open toward the upstream side in the feeding direction, the recessed portion being narrower on a downstream side thereof than on an upstream side thereof in the feeding direction, a downstream side of the recessed portion in the feeding direction communicating with an upstream portion of the lead groove (Claim 3).

Furthermore, in the seal ring according to the present invention, preferably, the recessed portion has the same depth as that of the lead groove and a semicircular shape projecting downstream of the front surface of the expanded diameter portion in the feeding direction (Claim 4).

According to the seal ring of the present invention, the recessed portion allows the material to be treated to migrate to the outermost portion in the cylinder while agitating a part of the material to be treated. Thus, the flow of the material to be treated between the seal ring and the inner wall surface of the cylinder can further be complicated.

Consequently, feeding resistance that suppresses the feeding of the material to be treated can be stabilized to maintain the difference in pressure between the upstream side and downstream side of the seal ring. This enables, for example, maintenance of the pressure in the area formed between the seal ring provided upstream of the cylinder and the seal ring provided downstream of the cylinder. A variation in the pressure in the area can be suppressed to maintain elevated temperature and elevated pressure in the area.

Furthermore, the recessed portion has the semicircular shape that is narrower toward the downstream side in the feeding direction. This enables a reduction in the compressive and frictional forces locally applied to the material to be treated by the expanded diameter portion. As a result, the material to be treated can be prevented from becoming denser and stronger early at the outermost portion, thus preventing aggregates from being generated.

The seal ring according to the present invention preferably comprises a circumferential groove formed in the outer circumferential surface and extending along a circumferential direction of the outer circumferential surface (Claim 5).

In the seal ring according to the present invention, preferably, a plurality of circumferential grooves are formed at predetermined intervals in the feeding direction (Claim 6).

In the seal ring according to the present invention, preferably, each of the circumferential grooves comprises a recessed circular arc-shaped recessed curved surface portion located on an upstream side thereof in the feeding direction and having a cross-sectional shape with a predetermined radius of curvature, and an inclined tapered portion located on a downstream side of the circumferential groove in the feeding direction and having a cross-sectional shape gradually inclined at a predetermined inclination angle from the recessed curved surface toward a radially outer side of the expanded diameter portion toward the downstream side in the feeding direction (Claim 7).

According to the seal ring of the present invention, the circumferential grooves are formed in the outer circumferential surface. If the material to be treated fed from upstream to downstream in the cylinder migrates from a position opposite to the outer circumferential surface to a position opposite to the circumferential grove, the gap between the material to be treated and the inner wall surface of the cylinder is widened. This enables the pressure acting on the material to be treated to be rapidly reduced to mitigate the pressure and a variation in flow. Then, as the material to be treated migrates again from the position opposite to the circumferential groove to the position opposite to the outer circumferential surface, the gap between the material to be treated and the inner wall surface of the cylinder is narrowed. This enables the pressure acting on the material to be treated to be elevated to vary the flow.

Then, the pressure and the like on the material to be treated is repeatedly reduced and increased by the plurality of circumferential grooves. Thus, the pressure and resistance exerted on the material to be treated in the flow direction thereof can be smoothed, resulting in safer seal resistance (fluidity). This is particularly effective for sealing property of an elevated temperature and pressure area in which the density of the material to be treated is rapidly increased.

Advantages of the Invention

According to the seal ring of the present invention, the lead groove is formed in the outer circumferential surface. Thus, the flow of the material to be treated passing between the outer circumferential surface and the inner wall surface of the cylinder can be disturbed and complicated. Therefore, the feeding resistance is stabilized to allow the difference in pressure between the upstream side and the downstream side to be maintained.

Furthermore, the lead groove allows a part of the material to be treated to be guided to the downstream side of the cylinder while suppressing the feeding of the material to be treated. This enables the upstream side of the seal ring to be prevented from being set an excessively high pressure, thus preventing aggregates from being generated upstream of the seal ring.

DESCRIPTION OF SYMBOLS

1 . . . cylinder, 1a . . . passage, 2 . . . feed port, 3 . . . ejection port, 4 . . . decomposing agent feed section, 4a . . . first feed section, 4b . . . second feed section, 5 . . . coolant feed section, 6 . . . enzyme feed section, 11 . . . coarse crushing zone, 12 . . . hot compressed water treatment zone, 12A . . . upstream zone, 12B . . . downstream zone, 13 . . . cooling zone, 14 . . . saccharification preparation zone, 15 . . . discharge zone, 21 to 25 . . . screw lines, 31 to 35 . . . resistors, 50 . . . forward full flight, 52 . . . backward full flight, 43 . . . forward double-threaded screw kneading disc, 54 . . . backward double-threaded screw kneading disc, 45 . . . perpendicular double-threaded screw kneading disc, 100 . . . special gear kneader, 200 . . . special fluffer ring, 300 . . . special seal ring

BEST MODE FOR CARRYING OUT THE INVENTION

Embodiments of the present invention will be described below with reference to the drawings. In the embodiments described below, a material to be treated is plant biomass by way of example. However, the material to be treated is not limited to the plant biomass. The present invention is applicable to treatment of any other material to be treated.

EMBODIMENTS

Embodiment 1

Figure 1:
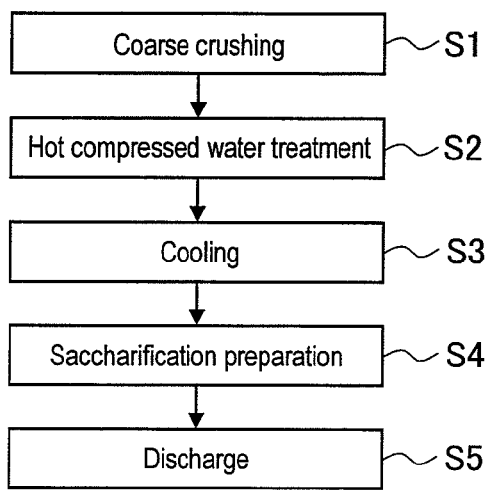
FIG. 1 is a flowchart illustrating a method for pre-treating plant biomass material to be treated.
Figure 2:
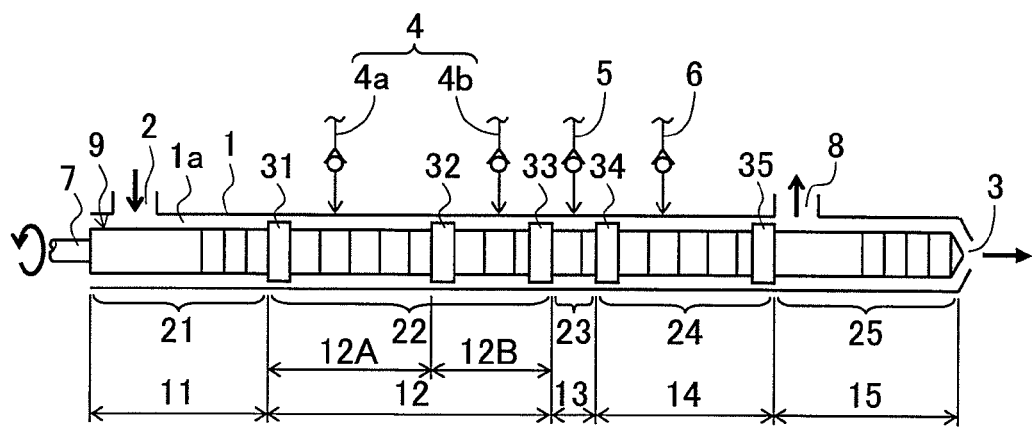
FIG. 2 is a diagram schematically showing a configuration of a cylinder and screw lines in a screw extruder.

FIG. 1 is a flowchart illustrating a method for pre-treating a plant biomass material to be treated according to the present embodiment. FIG. 2 is a diagram schematically showing a cylinder and screw lines in a screw extruder.

The method for pre-treating plant biomass material to be treated according to the present embodiment includes a coarse crushing step S1, a hot compressed water treatment step S2, a cooling step S3, a saccharification preparation step S4, and a discharge step S5 as shown in FIG. 1. These steps are carried out consecutively in order in a cylinder 1 of the screw extruder.

The screw extruder according to the present embodiment is a co-rotating double-screw extruder in which two juxtaposed screw lines rotate in the same direction. The screw extruder includes the cylinder 1 with a linearly extending passage 1a.

The cylinder 1 includes a feed port 2 formed at one end of the passage 1a and through which plant biomass (non-flowable material), for example, wood chips, is fed, and an ejection port 3 formed at the other end of the passage 1a and through which the plant biomass material to be treated pre-treated in the passage 1a is ejected.

Paired two screw shafts 7 connected to a drive motor (not shown in the drawings) are arranged in the passage 1a in the cylinder 1 parallel to each other. The screw lines 9 are constructed by attaching various screw segments such as full flight screw 50 and 52 and kneading discs 54, 56, and 58 to the paired screw shafts 7 in any combinations.

The screw line 9 forms feeding means including a plurality of feeding sections integrally rotated in the passage 1a by the screw shaft 7 rotated by the drive motor, to feed the material to be treated toward the ejection port 3, a shearing and kneading section that shears and kneads the material to be treated, and resistors that offer feeding resistance to the material to be treated.

A coarse crushing zone 11, a hot compressed water treatment zone 12, a cooling zone 13, a saccharification preparation zone 14, and a discharge zone 15 are constructed in series in the passage 1a in the cylinder 1. The hot compressed water treatment zone 12 is formed between resistors 31 and 33 provided separately on an upstream side and a downstream side of the passage 1a in a feeding direction. In the present embodiment, the hot compressed water treatment zone 12 includes the resistor 31, a resistor 32, and the resistor 33 provided in an upstream portion, an intermediate portion and a downstream portion thereof, respectively, and also includes an upstream zone 12A and a downstream zone 12B formed therein.

The cylinder 1 includes a decomposing agent feed section 4 for feeding a decomposing agent to the hot compressed water treatment zone 12, a coolant feed section 5 for feeding a coolant to the cooling zone 13, and an enzyme feed section 6 for feeding enzymes to the saccharification preparation zone 14.

A plurality of the decomposing agent feed sections 4 are provided at predetermined intervals in a longitudinal direction of the passage 1a. In the present embodiment, a first feed section 4a is provided in the upstream zone 12A, and a second feed section 4b is provided in the downstream zone 12B. The amount of decomposing agent to be fed per unit time is set for the relationship (first feed section 4a>second feed section 4b). The decomposing agent used is, for example, water such as cold or hot water, an acid, an alkali, a solvent, decay fungi, or a supercritical liquid. The decomposing agent is fed from the decomposing agent feed section 4 into the passage 1a and added to the plant biomass material to be treated.

The decomposing agent feed section 4 may be provided in the coarse crushing zone 11 to feed the decomposing agent to the coarse crushing zone 11. For example, feeding a decomposing agent such as acid or decay fungus to the coarse crushing are allows the decomposing agent to be added simultaneously with crushing of the plant biomass material to be treated. This increases efficiency.

The coolant feed section 5 feeds a coolant, for example, liquid nitrogen to the cooling zone 13 for cooling in order to adjust the temperature of the plant biomass material to be treated made hot by the hot compressed water treatment zone 12, to a value optimum for activity of the enzyme. The enzyme feed section 6 feeds the enzyme to the plant biomass material to be treated. In the saccharification preparation zone, the enzyme is mixed into the plant biomass material to be treated. A plurality of the coolant feed sections 5 and a plurality of the enzyme feed sections 6 may be provided at predetermined intervals in the longitudinal direction of the passage 1a.

The cylinder 1 includes a heater (not shown in the drawings) to heat the plant biomass material to be treated to allow an elevated temperature state of the plant biomass material to be treated to be maintained in the hot compressed water treatment zone. An appropriate amount of the plant biomass is fed through the feed port 2 into the passage 1a according to the elapse of time. The present embodiment uses wood-based biomass, for example, wood chips.

Steps S1 to S5 will be described below in detail.

In the coarse crushing step S1, the screw lines 9 rotate to shear, friction, dispersion, diffuse, and knead the chip-like plant biomass material to be treated. The chip-like plant biomass material to be treated is thus mechanically crushed into coarsely crushed chips each smaller than a preset size. The plant biomass material to be treated changed into the coarsely crushed chips is fed from the coarse crushing zone 11 to the hot compressed water treatment zone 12, located downstream of the coarse crushing zone 11.

A screw line 21 in the coarse crushing zone 11 is constructed by, for example, combining a forward full flight 50, a forward double-threaded screw kneading disc 54, a backward double-threaded screw kneading disc 56, and a perpendicular double-threaded screw kneading disc 58 together as needed. At least one of a special gear kneader 100 and a special fluffer ring 200 is arranged in a high filling area in which the plant biomass material to be treated formed in the coarse crushing zone 11 is filled at a high filling rate and a feeding area allowing feeding the plant biomass material to be treated to be fed to the hot compressed water treatment zone 12, located downstream of the coarse crushing zone 11.

The special gear kneader 100 and the special fluffer ring 200 disturbs the flow of the plant biomass material to be treated in the passage 1a to enable promotion of the sharing, coarse crushing, kneading, dispersion, and decomposition of the plant biomass material to be treated. This also allows the downstream feeding of the plant biomass material to be treated to be enhanced and stabilized, preventing aggregates from being generated. The plant biomass material to be treated is set at room temperature in the coarse crushing zone.

In the hot compressed water treatment zone 12, the decomposing agent, for example, water is fed from the first feed section 4a and the second feed section 4b into the passage 1a and added to the plant biomass material to be treated. Then, the screw line 22 rotates to carry out a hot compressed water treatment zone on the plant biomass material to be treated. In the hot compressed water treatment, the screw line 22 pulverizes, kneads, agitates, disperses, and decomposes the plant biomass material to be treated under hot compressed water.

The screw line 22 in the hot compressed water treatment zone 12 includes the resistors 31, 32, and 33 in a most upstream portion, a most downstream portion, and an intermediate portion, respectively, of the hot compressed water treatment zone 12 to suppress the feeding of the plant biomass material to be treated. The high filling area in which the plant biomass material to be treated is filled at a high filling rate is formed upstream of the resistors 31 to 33.

The hot compressed water treatment zone 12 thus has a sealing property enhanced by the resistors 31 to 33 and is maintained in an elevated pressure state; the pressure in the hot compressed water treatment zone 12 is kept equal to or higher than a saturated vapor pressure (the pressure is kept, for example, between 1 MPa and 30 MPa).

Each of the resistors 31 and 33 includes a special seal ring 300. The area between the special seal ring 300 and an inner wall surface of the cylinder passage 1a is sealed by the plant biomass material to be treated to create a closed state. This allows the pressure in the hot compressed water treatment zone 12 to be raised.

In the hot compressed water treatment zone 12, heating by the heater and sharing frictional heat applied by the screw line 9 allow the temperature of the plant biomass material to be treated in the hot compressed water treatment zone 12 to be maintained between 130° C. and 350° C.

Thus, the hot compressed water treatment zone 12 can be set under hot compressed water (at elevated pressure and elevated temperature) so as to carry out a hydrothermal treatment to swell and soften the plant biomass material to be treated with the decomposing agent added thereto. Therefore, the hydrothermally treated plant biomass material to be treated can be easily pulverized by the screw line 22, which shears and kneads the plant biomass material to be treated.

If decay fungi are added as a decomposing agent, the plant biomass material to be treated is maintained between room temperature and 80° C. Furthermore, if supercritical water is added as a decomposing agent, the pressure in the hot compressed water treatment zone 12 is set equal to or higher than a supercritical pressure.

The screw line 22 is constructed by combining the special seal ring 300, the special gear kneader 100, the special fluffer ring 200, the forward full flight 50, the backward full flight 52, the forward double-threaded screw kneading disc 54, the backward double-threaded screw kneading disc 56, the perpendicular double-threaded screw kneading disc 58, and the like as needed.

The hot compressed water treatment zone 12 is partitioned into the upstream zone 12A and the downstream zone 12B by the resistor 32 in the intermediate portion thereof. The screws in the screw line 22 are designed such that at least one of the special gear kneader 100 and the special fluffer ring 200 in each of the high filling area formed by the resistors 31 to 33, the feeding area allowing the plant biomass material to be treated to be fed from the upstream zone 12A to the downstream zone 12B, and the feeding area allowing the plant biomass material to be treated to be fed from the downstream zone 12B to the cooling zone 13.

Arranging the special gear kneader 100 and the like in the high filling area enables the plant biomass material to be treated to be quickly pulverized, kneaded, agitated, dispersed, and decomposed. Furthermore, arranging the special gear kneader 100 and the like in the high filling area enables the plant biomass material to be treated to be prevented from locally undergoing a compressive force and a frictional force. This in turn prevents aggregates from being generated.

Each of the resistors 31 to 33 in the screw line 22 includes a combination of the special seal ring 300, the backward full flight 32, the special gear kneader 100, and the special fluffer ring 200. The resistances of the resistors 31 to 33 are set for the relationship (the resistor 31 in the most upstream portion<the resistor 32 in the intermediate portion<the resistor 33 in the most downstream portion) so that the resistance increases toward a downstream side of the screw line.

In the hot compressed water treatment zone 12, toward a downstream side of the hot compressed water treatment zone 12, the miniaturization, kneading, and decomposition of the plant biomass material to be treated progress and the shearing resistance, kneading diffusion resistance, and flow resistance of the plant biomass material to be treated decreases with the progress. Thus, the gap between the plant biomass material to be treated and the inner wall surface of the passage 1a is reduced toward the downstream side of the hot compressed water treatment zone 12 to ensure the appropriate flow and filling rate in each of the upstream zone 12A and the downstream zone 12B. As a result, the plant biomass material to be treated diffuses and disperses reliably under the effect of the decomposing agent, and is efficiently decomposed.

Furthermore, the resistors 31 to 33 are arranged in the upstream portion, the intermediate portion, and the downstream portion, respectively, along the flow direction. Thus, the plant biomass material to be treated can be repeatedly compressed and swollen, allowing each treatment to be efficiently carried out.

The first feed section 4a is arranged on an upstream side of the upstream zone 12A, and the second feed section 4b is arranged in an upstream side of the downstream zone 12B. Thus, the distance over which the hydrothermal treatment is performed is maximized in each zone portion, allowing the hydrothermal treatment to be effectively carried out. If the decomposing agent is water, the ratio of the amount of decomposing agent fed to the amount of the plant biomass material to be treated is set to 0.25 to 3. If the decomposing agent is an acid, an alkali, or a solvent, the ratio is set to 0.01 to 1.

The hot compressed water treatment zone 12 is maintained at the elevated pressure and temperature by the special seal ring 300. Thus, the hydrothermal treatment can be efficiently achieved to soften the plant biomass material to be treated. Consequently, the plant biomass material to be treated is pulverized by the shearing, kneading, dispersing, and decomposing action of the screw line 22 and becomes finer than when the plant biomass material to be treated is in the coarse crushing zone 11. The numbers of first feed sections 4a and second feed sections 4b installed are each the same as that of high filling areas formed in the hot compressed water treatment zone 12 in order to allow the hydrothermal treatment to be effectively carried out.

The position to which the decomposing agent feed section 4 feeds the decomposing agent may be set depending on conditions such as the pressure and temperature in the hot compressed water treatment zone 12. Feeding the decomposing agent to the appropriate position allows the plant biomass material to be treated to be quickly pulverized, kneaded, agitated, dispersed, and decomposed, thus preventing an excess amount of treatment agent from being feed. The plant biomass material to be treated in the hot compressed water treatment zone 12 is fed to the cooling zone 13, located downstream of the hot compressed water treatment zone 12.

In the cooling step S3, a treatment is carried out in which the coolant such as liquid nitrogen is fed from the coolant feed section 5 into the passage 1a to cool the plant biomass material to be treated in the cooling zone 13. A screw line 23 is constructed by combining together only screw segments such as the forward full flight 50 which have a feeding function.

Since the plant biomass is heated in the hot compressed water treatment zone 12, the temperature of the plant biomass just fed from the hot compressed water treatment zone 12 is not preferable for the enzyme. Hence, in this temperature status, when the enzyme is material to be treated into the plant biomass material to be treated in the saccharification preparation step S4, saccharification based on the enzyme may be difficult. Thus, the cooling step S3 is provided between the hot compressed water treatment step S2 and the saccharification preparation step S4 to cool the hot plant biomass material to be treated down to an appropriate temperature for the appropriate saccharification based on the enzyme. The plant biomass material to be treated is cooled down to 40° C. to 50° C. by the coolant.

In the saccharification preparation step S4, a treatment is carried out in which the enzyme is fed from the enzyme feed section 6 into the passage 1a and mixed with the plant biomass material to be treated in the saccharification preparation zone 14.

A screw line 24 in the saccharification preparation zone 14 is constructed by, for example, combining the special seal ring 300, the special gear kneader 100, the special fluffer ring 200, the forward full flight 50, the backward full flight 52, the forward double-threaded screw kneading disc 54, the backward double-threaded screw kneading disc 56, the perpendicular double-threaded screw kneading disc 58, and the like together as needed. A predetermined amount of enzyme liquid is fed from the enzyme feed section 6 into the passage 1a and added to the plant biomass material to be treated in the saccharification preparation zone 14 (for example, 40 FPU).

When the process progresses to the saccharification preparation step S4, the plant biomass material to be treated is very viscous and may not be sufficiently mixed with the enzyme by an operator or the like. However, in the saccharification preparation zone 14, the mixing is carried out by the screw line 24 to enable the plant biomass material to be treated to be sufficiently mixed with the enzyme. The plant biomass material to be treated, when mixed with the enzyme in the saccharification preparation zone 14, is fed to the discharge zone 15, located downstream of the saccharification preparation zone 14.

In the discharge step S5, a process is carried out in which the plant biomass material to be treated mixed with the enzyme in the saccharification preparation zone 14 is discharged as a pre-treated material to be treated. A treatment is also carried out in which gas components are evacuated from the plant biomass material to be treated with saccharification prepared therefor. The cylinder 1 includes an evacuating vent 8. The vent 8 allows the discharge zone 15 of the passage 1a to communicate with the exterior and enables some of the gas components in the discharge zone 15 to be discharged.

When some of the gas components are discharged through the vent 8, the moisture content of the decomposing agent in the plant biomass material to be treated can be appropriately adjusted. Furthermore, unwanted gas components are removed to allow the plant biomass material to be treated in the optimum state to be fed to a saccharification step, the subsequent step. The plant biomass material to be treated ejected through the ejection port 3 is subjected to steps (saccharification, fermentation, and purification) similar to conventional ones and thus converted into ethanol.

A screw line 25 in the discharge zone 15 is constructed by, for example, combining screw segments including the forward double-threaded screw kneading disc 54, the backward double-threaded screw kneading disc 56, and the perpendicular double-threaded screw kneading disc 58 together as needed. At least one of the special gear kneader 100 and the special fluffer ring 200 is arranged in the downstream zone allowing the plant biomass material to be treated to be ejected through the ejection port 3.

According to the above-described method for pre-treating the plant biomass, the pre-treatment steps are carried out consecutively in order in the extruder as follows: the plant biomass is coarsely crushed to a preset size or smaller, the decomposing agent is added to the plant biomass, the plant biomass with the decomposing agent added thereto is subjected to the hot compressed water treatment, and the plant biomass is then mixed with the enzyme for saccharification preparation. Thus, the treatments separately and independently carried out in the conventional art, that is, the coarse crushing, the hot compressed water treatment, and the saccharification preparation can be consistently achieved. Therefore, the pre-treatment can be effectively carried out to allow facilities to be simplified, reducing the cost of the facilities. This enables a reduction in costs.

[Screw Shape]

In the present embodiment, the screw segments included in the screw line 9 will be described below.

Figure 3:
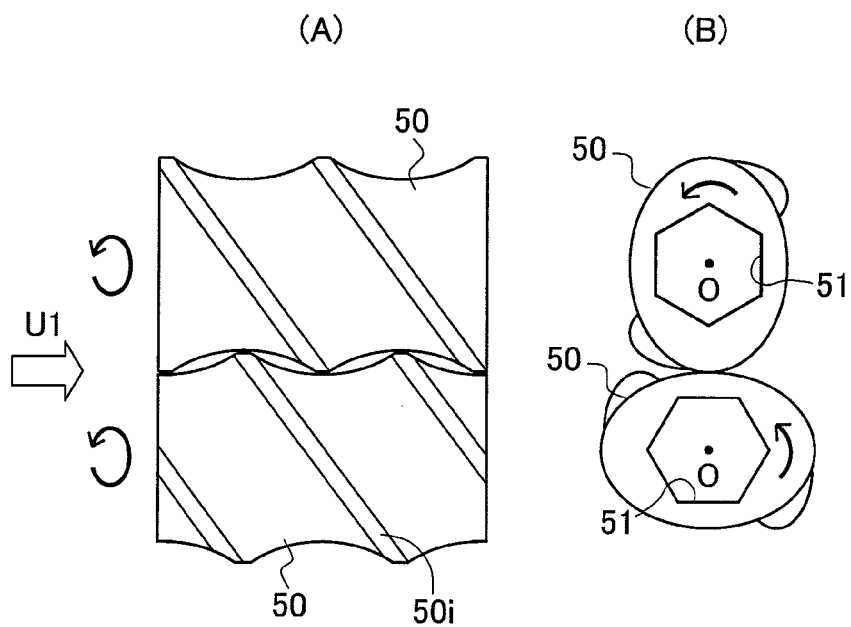
FIG. 3 is a diagram showing a configuration of a forward full flight.
Figure 4:
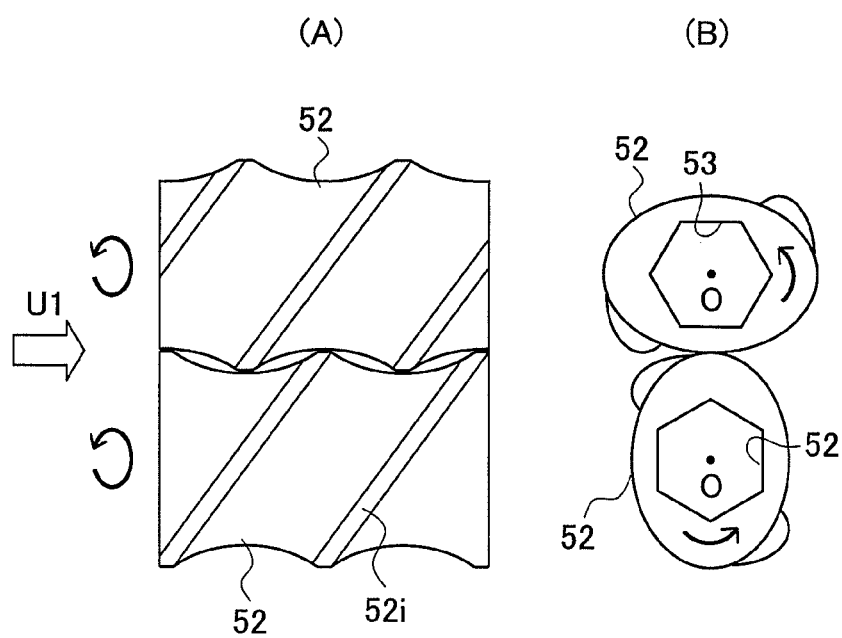
FIG. 4 is a diagram showing a configuration of a backward full flight.

FIGS. 3(A) and 3(B) are diagrams showing an example of the forward full flight. FIGS. 4(A) and 4(B) are diagrams showing an example of the backward full flight. In FIGS. 3(B) and 4(B), the inner wall surface of the passage 1a in the cylinder 1, which is shaped substantially like a true circle, is omitted.

In the forward full flight 50, a helix direction of a screw 50i is set so as to ensure the capability of downstream feeding. In the backward full flight 52, a helix direction of a screw 52i is set so as to lower the capability of downstream feeding.

Figure 5:
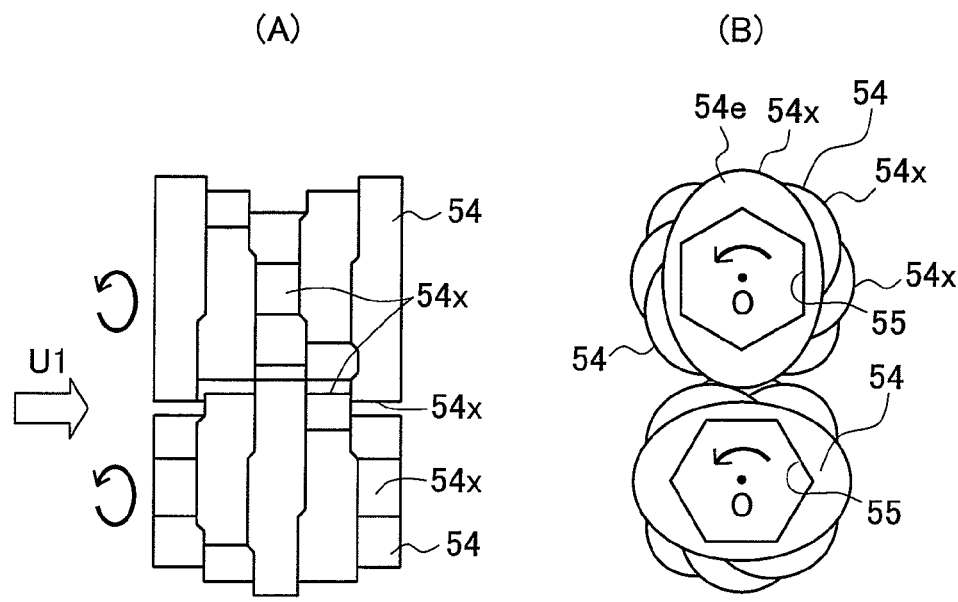
FIG. 5 is a diagram showing a configuration of a forward double-threaded screw kneading disc.

FIGS. 5(A) and 5(B) show an example of the forward double-threaded screw kneading disc 54. The forward double-threaded screw kneading disc 54 includes substantially oval paddles 54e with respective top portions 54x arranged rightward down in series.

Figure 6:
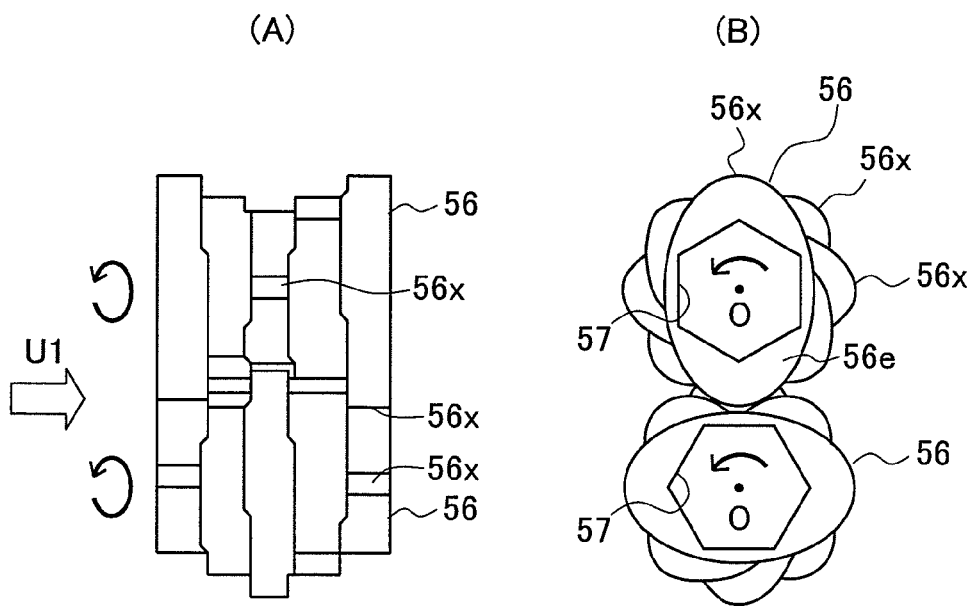
FIG. 6 is a diagram showing a configuration of a backward double-threaded screw kneading disc.

FIGS. 6(A) and 6(B) show an example of the backward double-threaded screw kneading disc 56. The backward double-threaded screw kneading disc 56 includes substantially oval paddles 56e with respective top portions 56x arranged rightward up in series.

Figure 7:
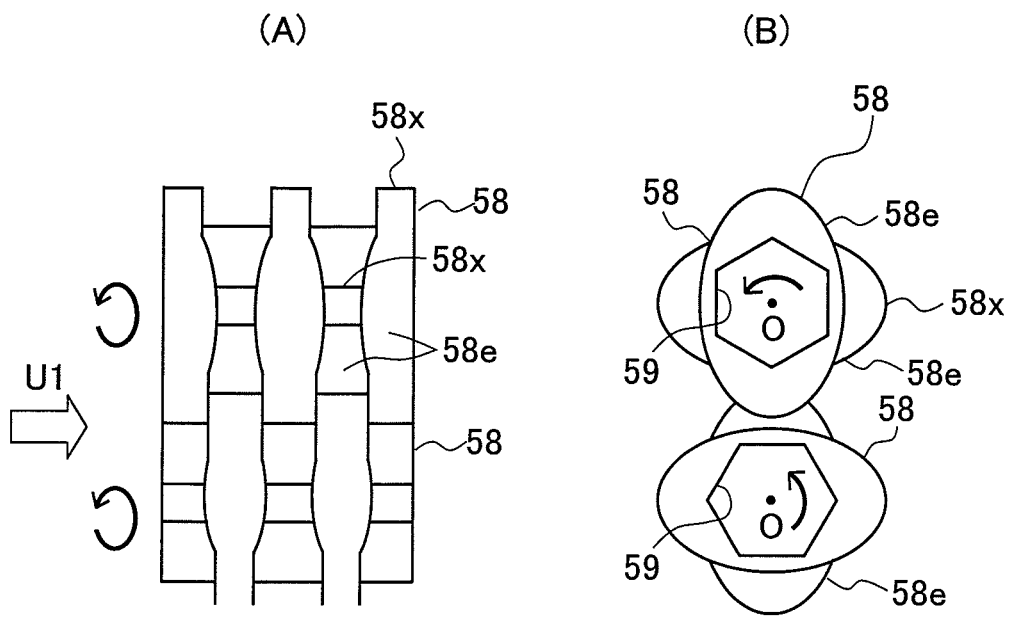
FIG. 7 is a diagram showing a configuration of a perpendicular double-threaded screw kneading disc.

FIGS. 7(A) and 7(B) show an example of the perpendicular double-threaded screw kneading disc 58. The perpendicular double-threaded screw kneading disc 28 includes substantially oval paddles 58e each having a top portion 58x and arranged in series so as to incline to each other at an angle of 90°. The perpendicular double-threaded screw kneading disc 58 has no helix angle and thus almost no feeding capability but has a high shearing capability, a high dispersion capability, and a high kneading capability.

The forward full flight 50, the backward full flight 52, the forward double-threaded screw kneading disc 54, the backward double-threaded screw kneading disc 56, and the perpendicular double-threaded screw kneading disc 58 include through-holes 51, 53, 55, 57, and 59, respectively, drilled along a central axis.

Figure 8:
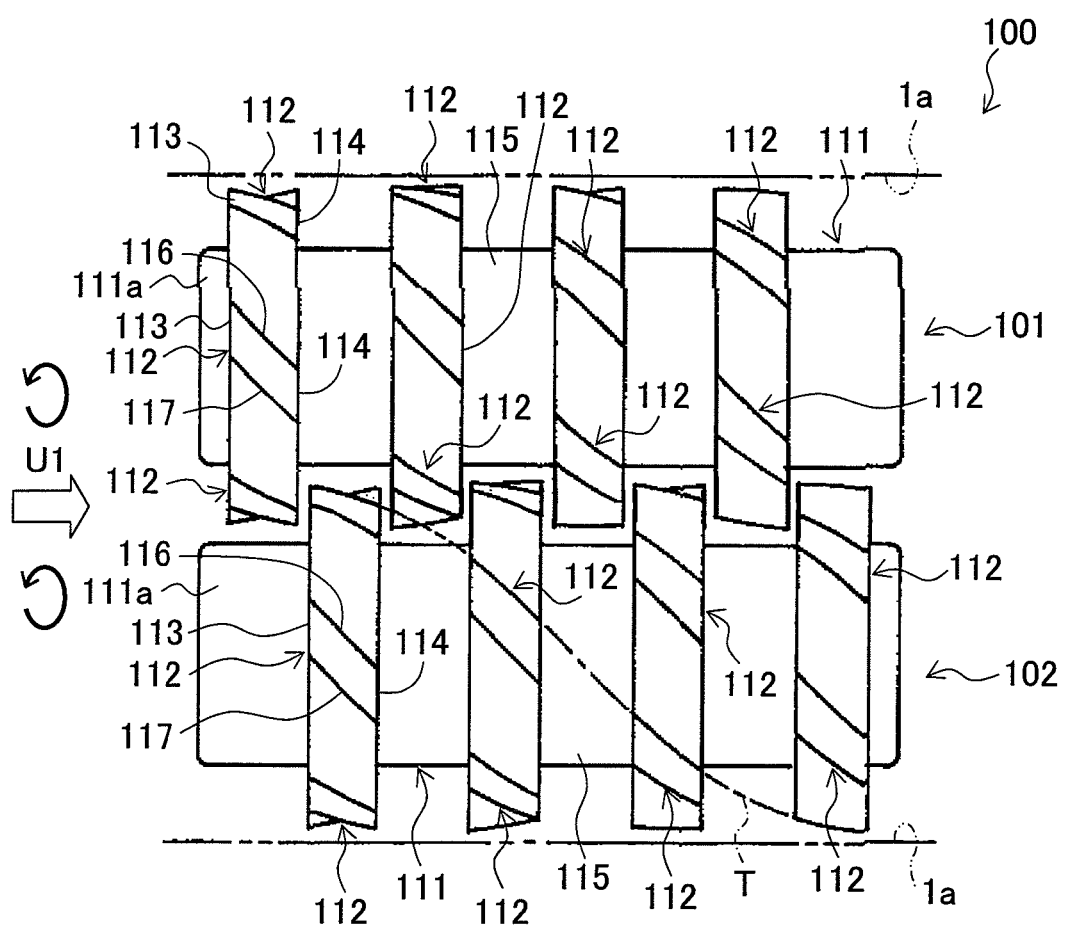
FIG. 8 is a diagram showing a configuration of a special gear kneader.
Figure 9:
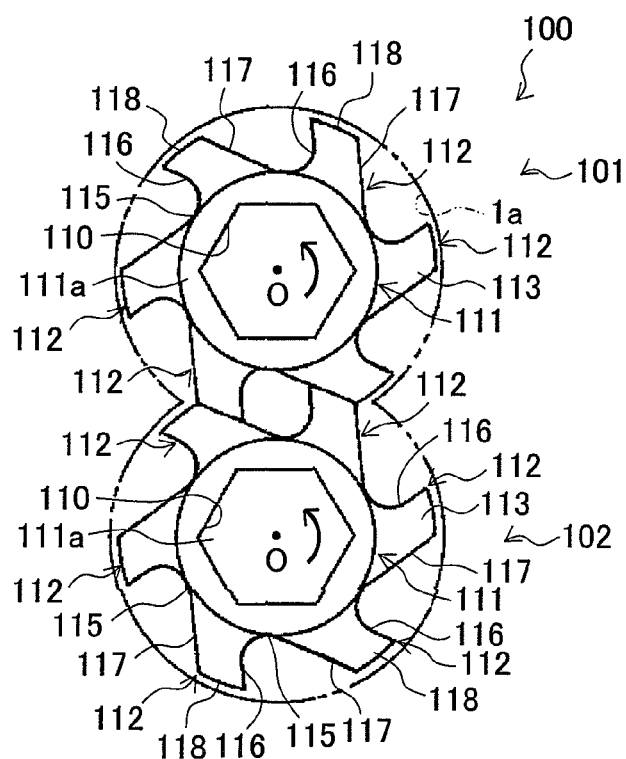
FIG. 9 is a diagram of the special gear kneader in FIG. 8 as seen in the direction of arrow U1.
Figure 10:
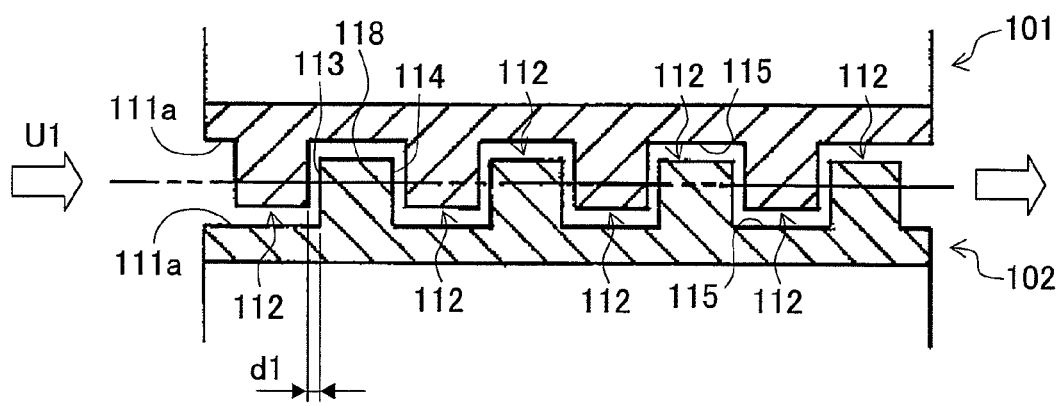
FIG. 10 is a schematic diagram showing a gear engaged state of the special gear kneader in FIG. 8, in cross section.
Figure 11:
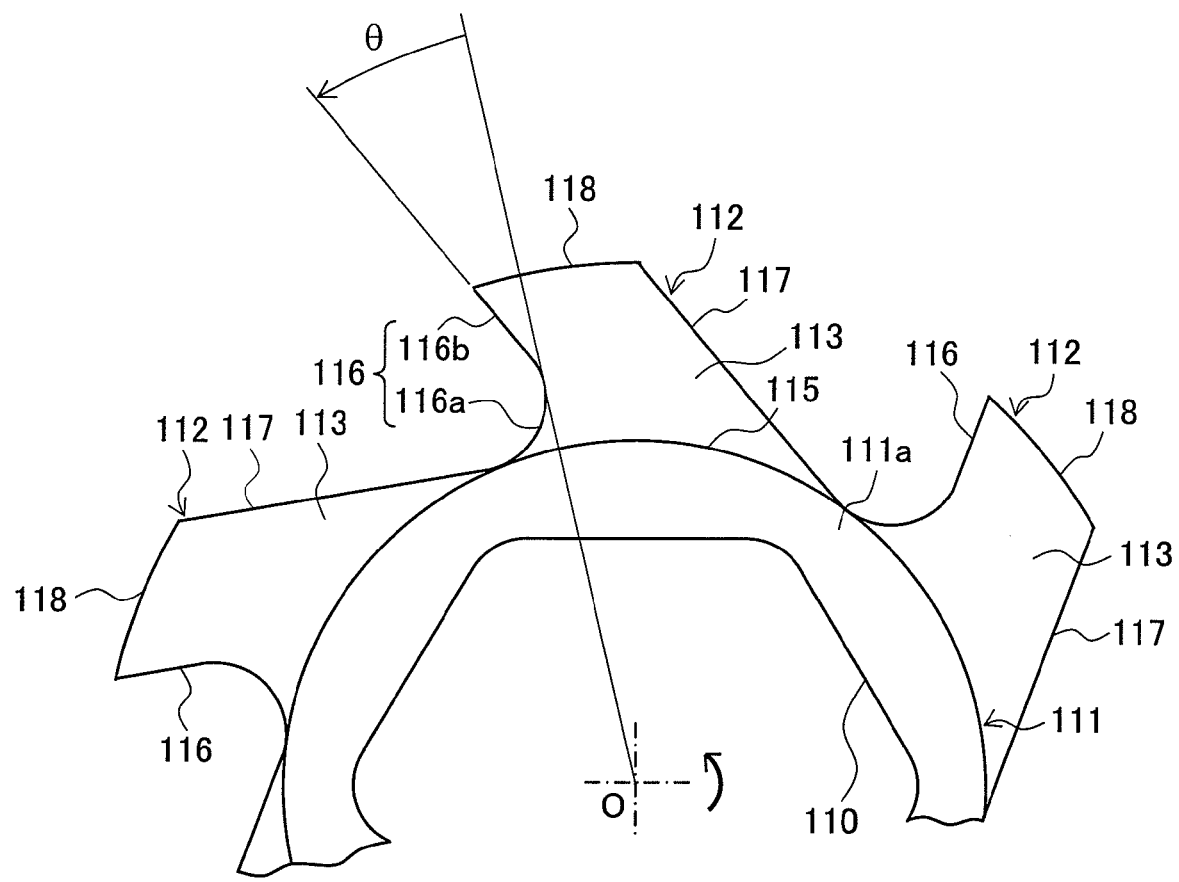
FIG. 11 is a diagram showing some of tooth portions shown in FIG. 9, in an enlarged view.

Now, the configuration of the special gear kneader will be described. FIG. 8 is a diagram showing an example of the configuration of the special gear kneader. FIG. 9 is a diagram of the special gear kneader as seen in the direction of arrow U1, which corresponds to the feeding direction of the plant biomass material to be treated. FIG. 10 is a schematic diagram showing a gear engaged state of the special gear kneader shown in FIG. 8, in cross section. FIG. 11 is a diagram showing some of tooth portions shown in FIG. 9, in an enlarged view.

As shown in FIG. 8 or FIG. 9, the special gear kneader 100 includes a first rotator 101 and a second rotator 102. Each of the first rotator 101 and the second rotator 102 includes a plurality of tooth portions 112 on a cylindrical shaft portion 111.

As shown in FIG. 9, the shaft portion 111 includes a hexagonal through-slot 110 drilled along the central axis of the shaft portion 111. The special gear kneader 100 can be rotated integrally with screw shaft 7 by fixedly inserting the screw shaft 7 through the through-slot 110.

As shown in FIG. 9, the plurality of tooth portions 112 are provided so as to project at predetermined intervals in a circumferential direction of the shaft portion 111. In the present embodiment, six tooth portions 112 are arranged at regular intervals. The number of the tooth portions 112 is not limited to the one according to the present embodiment but may be at least one.

Furthermore, as shown in FIG. 8, the plurality of tooth portions 112 are provided at the predetermined intervals in the feeding direction U1 corresponding to the longitudinal direction of the shaft portion 111. In the present embodiment, if the six tooth portions 112 contiguously arranged in the circumferential direction of the shaft portion 111 are counted as one tooth portion group, the tooth portions 112 are arranged so as to form a total of four tooth portion groups in the feeding direction. The number of the tooth portion groups is also not limited to the one according the present embodiment. Any plural number of tooth portion groups may be provided.

The tooth portion 112 has a given thickness along the longitudinal direction of the shaft portion 111. The tooth portion 112 includes a front surface 113 formed on the upstream side in the feeding direction, which corresponds to a front side of the shaft portion 111 in the longitudinal direction thereof, the front surface extending along a radial direction of the shaft portion 111. The tooth portion 112 also includes a rear surface 114 formed on a downstream side of the tooth portion 112 in the feeding direction, which corresponds to a rear side of the shaft portion 111 in the longitudinal direction thereof, the rear surface extending along the radial direction of the first shaft portion 111.

Furthermore, as shown in FIG. 9, the tooth portion 112 includes tooth surfaces 116 and 117 extending outward from a cylindrical outer-circumferential surface 115 of the shaft portion 111 in the radial direction of the shaft portion 111, and a top surface 118 located between upper ends of the tooth surfaces 116 and 117 contiguously with the tooth surfaces 116 and 117.

As shown in FIG. 8, the tooth surfaces 116 and 117 are inclined toward a rearward side of a rotating direction toward the downstream side in the feeding direction, and have a predetermined helix angle (lead). A spiral lead shown in phantom in FIG. 8 is obtained by connecting, in the longitudinal direction of the shaft portion 111, the tooth surfaces 116 and 117 of the plurality of tooth portions 112 contiguously arranged at the predetermined intervals in the longitudinal direction. When the first rotator 101 or the second rotator 102 rotate in the direction of arrows, the plant biomass material to be treated is appropriately fed in the direction of arrow U1 by the helix angle of the tooth surfaces 116 and 117 of the tooth portion 112.

The tooth surface 116, one of the paired tooth surfaces 116 and 117, is positioned on a forward side of the rotating direction of the first rotator 101 or the second rotator 102, and includes a curved surface portion 116a rising smoothly outward in the radial direction of the shaft portion 111 from the cylindrical outer-circumferential surface 115, and a planar vertical wall surface portion 116b extending contiguously with the curved surface portion 116a and outward in the radial direction so as to leave the shaft portion 111 and inclined at an inclination angle θ toward the forward side of the rotating direction toward an outer side of the tooth portion in the radial direction, as shown in FIG. 11.

On the other hand, the tooth surface 117, positioned on the rearward side of the rotating direction, has a planar shape extending outward in the radial direction from the cylindrical outer-circumferential surface 115 of the shaft portion 111 and inclined toward the forward side of the rotating direction toward the outer side of the tooth portion in the radial direction. In the present embodiment, the tooth surface 117 is formed parallel to the vertical wall surface portion 116b of the tooth surface 116.

The top surface 118 is shaped like a circular arc centered at the axis O of the shaft portion 111. As shown in FIG. 9, the top surface 118 is formed opposite the inner wall surface of the passage 1a, which is shaped like a true circle, so as to have a predetermined gap between the top surface 118 and the inner wall surface.

As shown in FIG. 8, the first rotator 101 and the second rotator 102 are arranged parallel to each other so that each of the tooth portions 112 of one of the shaft portions 111 is positioned between the corresponding paired tooth portions 112 arranged at the predetermined interval in the longitudinal direction of the other shaft portion 111. The tooth portions 112 of the first rotator 101 alternate with the tooth portions 112 of the second rotator 102. As shown in FIG. 10, between the first rotator 101 and the second rotator 102, squared U-shaped gaps and inverted squared U-shaped gaps are contiguously formed in the direction of arrow U1, which corresponds to the feeding direction, to ensure the kneading capability and dispersion capability of the special gear kneader 100. A predetermined distance d1 is set between the rear surface 114 of the tooth portion 112, positioned on the upstream side in the feeding direction, and the front surface 113 of the tooth portion 112, positioned downstream in the feeding direction and partly opposite the rear surface 114.

Reducing the distance d1 enhances resistance to the feeding of the plant biomass material to be treated. The distance d1 can function as a resistor restraining the feeding of the plant biomass material to be treated. Thus, the gear kneader 100 is also preferably arranged at a position in the hot compressed water treatment zone 12 of the cylinder 1 where the high filling area is formed.

The shaft portions 111 of the first rotator 101 and the second rotator 102 each include a boss portion 111a projecting in the longitudinal direction of the shaft portion 111 from the tooth portion 112 positioned at a front end of the shaft portion 111 on the upstream side in the feeding direction. The boss portion 111a serves to avoid the situation where the plant biomass material to be treated fed from the upstream side in the feeding direction collides against the front surface 113 of the tooth portion 112 positioned at the front end of the shaft portion 111, with the flow velocity of the plant biomass material to be treated maintained. This in turn allows this tooth portion 112 to be prevented from locally rapidly undergoing a compressive force and a frictional force, thus reducing a variation in torque acting on a motor that rotationally drives the screw shaft.

Rotation timings are set for the first rotator 101 and the second rotator 102 such that, for example, as shown in FIG. 9, the tooth portions 112 of one of the shaft portions 111 approach and cross the tooth portions 112 of the other shaft portion 111 at an intermediate position between the first rotator 101 and the second rotator 102.

In the special gear kneader 100 configured as described above, the tooth surface 116 formed on the forward side of the tooth portion 112 in the rotating direction includes the vertical wall surface portion 116b inclined at the inclination angle θ toward the forward side of the rotating direction. Thus, rotation of the first rotator 101 and the second rotator 102 enables a reduction in a bias force exerted on the plant biomass material to be treated and acting outward in the radial direction of the shaft portion. Therefore, the plant biomass material to be treated can be prevented from being migrated outward in the passage 1a in the cylinder 1 under a centrifugal force and locally undergoing a compressive force and a frictional force. This allows aggregates to be prevented from being generated.

Figure 38:
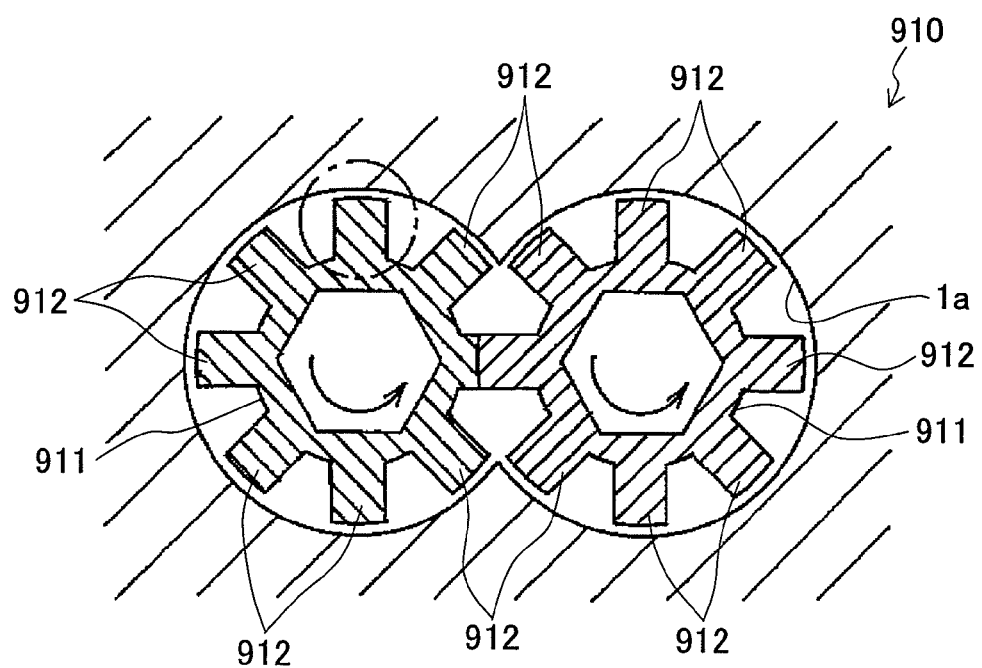
FIG. 38 is a schematic diagram of a gear kneader provided in a conventional double-screw extruder.
Figure 39:
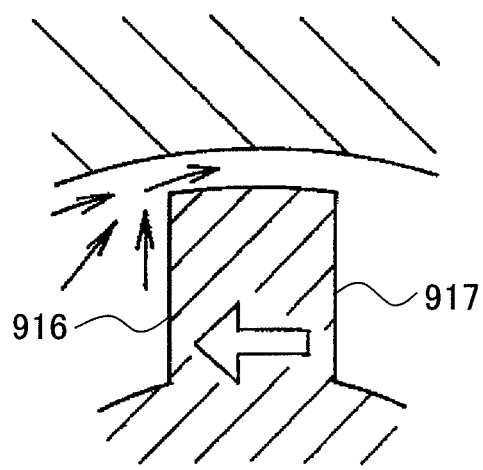
FIG. 39 is a diagram showing an essential part of the gear kneader in FIG. 38 in an enlarged view.

FIG. 38 is a schematic diagram of a gear kneader 910 provided in a known double-screw extruder. FIG. 39 is a diagram showing an essential part of the gear kneader 910 in FIG. 38. As shown in FIG. 38 and FIG. 39, tooth portions 912 of the conventional gear kneader 910 project radially from a shaft portion 911. One of paired tooth surfaces 916 and 917, the tooth surface 916 positioned on the forward side of the tooth portion in the rotating direction, has a planar shape toward the rearward side of the rotating direction toward the outer side of the tooth portion in the radial direction.

Thus, a fluidized material such as wood powder is blown outward in the radial direction of the first rotator 901 and the second rotator 902 and locally subjected to a compressive force and a frictional force as shown by thin arrows in FIG. 39. As a result, denser and firmer aggregates are generated early in the outermost portion in the passage 1a. The compressive and frictional forces and the like of the aggregates inhibit the rotation of the first rotator 901 and the second rotator 902, leading to an overmaterial to be treated (motor torque is exceeded) and hindered feeding.

In contrast, as shown particularly in FIG. 11, the special gear kneader 100 includes the tooth portion 112 with the tooth surface 116 positioned on the front side of the tooth portion 112 in the rotating direction and including the vertical wall surface portion 116b inclined at the inclination angle θ toward the forward side of the rotating direction. This enables a reduction in the bias force exerted on the plant biomass material to be treated and acting outward in the radial direction of the shaft portion, thus effectively preventing aggregates from being generated in the passage 1a in the cylinder 1. The prevention of generation of aggregates in turn prevents deformation of the screw shaft 7 in the radial direction of the shaft portion and a frictional force and an overmaterial to be treated caused by the contact of the tooth portion 112 with the passage 1a of the cylinder 1.

Furthermore, if the first rotator 101 and the second rotator 102 are rotated to move, in directions opposite to each other, the tooth portions 112 arranged adjacent to each other in the longitudinal direction of the shaft portion to shear the plant biomass material to be treated, the plant biomass material to be treated can be sheared by the vertical wall surface portion 116b, inclined at the inclination angle θ toward the forward side of the rotating direction. This enables a reduction in a force required to shear the plant biomass material to be treated. Therefore, a driving force required for the extruder can be reduced to allow the drive motor to be miniaturized.

Furthermore, as shown in FIG. 8 in phantom, the tooth surface 116 of the tooth portion 112 has a predetermined helix angle with respect to the longitudinal direction of the shaft portion and thus allows the plant biomass material to be treated to be biased so as to migrate from upstream to downstream in the feeding direction. This enables a reduction in a bias force acting outward in the radial direction, thus preventing the plant biomass material to be treated from being significantly compressed by the outermost portion in the passage 1a in the cylinder 1.

In the above-described special gear kneader 100, the plurality of tooth portions 112 arranged at the predetermined intervals in the longitudinal portion of the shaft portion all have the given helix angle (lead) by way of example. However, the magnitude of the helix angle may be varied depending on the position where the tooth portion is located in the longitudinal direction of the shaft portion. For example, the amount of plant biomass material to be treated fed can be set greater on the downstream side in the feeding direction than on the upstream side by increasing the helix angle of the tooth surfaces 116 and 117 of the tooth portions 112 positioned on the upstream side in the feeding direction, while reducing the helix angle of the tooth surfaces 116 and 117 of the tooth portions 112 positioned on the downstream in the feeding direction. Furthermore, the filling rate and density of the plant biomass material to be treated can be varied depending on the position in the longitudinal direction of the shaft portion, allowing treatments such as shearing and diffusion to be more effectively achieved.

Figure 20:
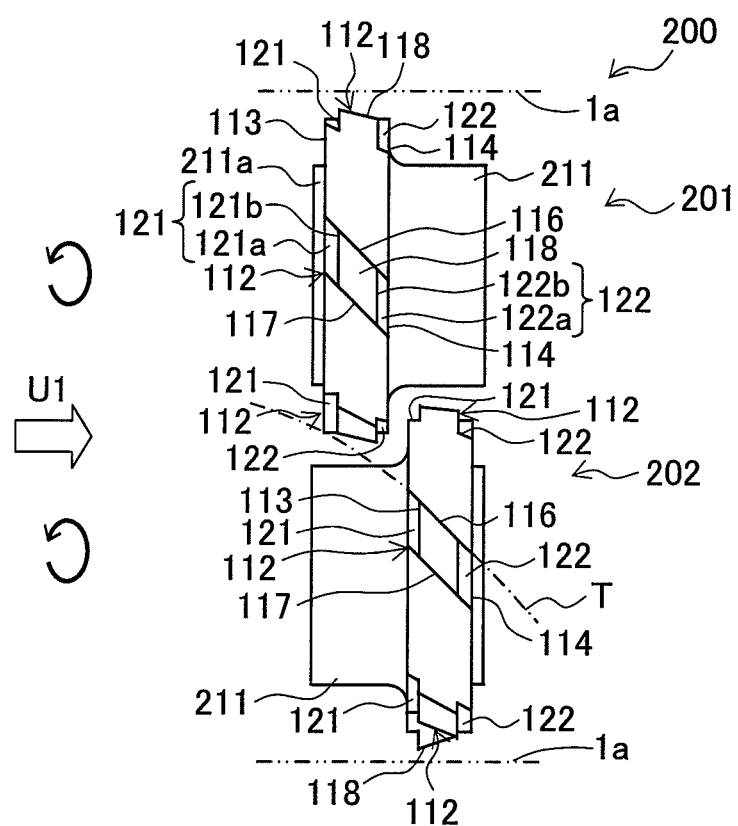
FIG. 20 is a diagram showing an example of a special fluffer ring.
Figure 21:
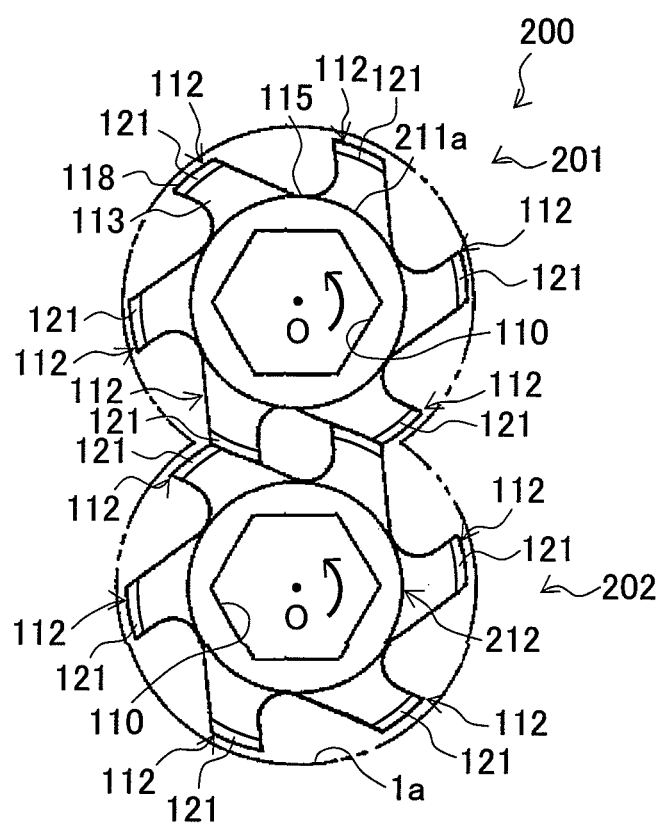
FIG. 21 is a diagram showing the special fluffer ring in FIG. 20 as seen in the direction of arrow U1.

Next, FIG. 20 and FIG. 21 show an example of the special fluffer ring 200. FIG. 20 is a diagram showing an example of the special fluffer ring 200. FIG. 21 is a diagram of the special fluffer ring 200 in FIG. 20 as seen in the direction of arrow U1, which corresponds to the feeding direction of the plant biomass material to be treated. Components of the special fluffer ring 200 which are similar to those of the above-described special gear kneader 100 are denoted by the same reference numerals. Detailed description of these components is omitted.

The special fluffer ring 200 includes a first rotator 201 and a second rotator 202. Each of the first rotator 201 and the second rotator 202 includes a plurality of tooth portions 112 on a cylindrical shaft portion 211. As shown in FIG. 21, the plurality of tooth portions 112 are provided so as to project at predetermined intervals in a circumferential direction of the shaft portion 211. In the present embodiment, six tooth portions 112 are arranged at regular intervals.

As shown in FIG. 20, the first rotator 201 is configured such that the tooth portion 112 is provided on the upstream side in the feeding direction, corresponding to the front side in the longitudinal direction of the shaft portion 211, which projects downstream of the tooth portion in the feeding direction, that is, toward the rear side of the shaft portion 211 in the longitudinal direction thereof. The second rotator 202 is configured such that the tooth portion 112 is provided on a downstream side of the shaft portion 211 in the feeding direction, with the shaft portion 211 projecting upstream in the feeding direction.

The first rotator 201 and the second rotator 202 are arranged such that the tooth portion 112 of the first rotator 201 lie opposite the shaft portion 211 of the second rotator 202, whereas the tooth portion 112 of the second rotator 202 lie opposite the shaft portion 211 of the first rotator 201. The tooth portion 112 of the first rotator 201 and the tooth portion 112 of the second rotator 202 are arranged close to each other in the feeding direction.

A passage bent in a crank form along the direction of arrow U1, which corresponds to the feeding direction, is formed between the first rotator 201 and the second rotator 202 to ensure the kneading capability and dispersion capability of the special fluffer ring 200.

The first rotator 201 includes a boss portion 211a projecting from the tooth portion 112 in the longitudinal direction of the shaft portion. In the second rotator 202, the shaft portion 211 is provided upstream of the tooth portion 112 in the feeding direction.

The boss portion 211a of the first rotator 201 and the shaft portion 211 of the second rotator 202 serve to avoid the situation where the plant biomass material to be treated fed from the upstream side in the feeding direction collides against the front surface 113 of the tooth portion 112 positioned at the front end of the shaft portion 111, with the flow velocity of the plant biomass material to be treated maintained. This in turn allows this tooth portion 112 to be prevented from locally rapidly undergoing a compressive force and a frictional force, thus reducing a variation in torque acting on the motor that rotationally drives the screw shaft 7.

Rotation timings are set for the first rotator 201 and the second rotator 202 such that, for example, as shown in FIG. 21, the tooth portions 112 of one of the shaft portions 211 approach and cross the tooth portions 112 of the other shaft portion 211 at an intermediate position between the first rotator 201 and the second rotator 202.

Stepped portions 121 and 122 are formed at a leading end portion of the tooth portion 112. In the example shown in FIG. 20 and FIG. 21, the stepped portion 121 is formed in all of the six tooth portions 112 arranged on each of the first rotator 101 and the second rotator 102 in the circumferential direction of the shaft portion. Not all the tooth portions 112 provided in the special fluffer ring 200 need to include the stepped portions 121 and 122. The arrangement positions and number of and the intervals between the tooth portions 112 with the stepped portions 121 and 122 may be appropriately set according to the situation.

The stepped portion 121 is formed between the tooth surfaces 116 and 117 at an edge portion between the front surface 113 and top surface 118 of the tooth portion 112. The stepped portion 122 is formed between the tooth surfaces 116 and 117 at an edge portion between the rear surface 114 and top surface 118 of the tooth portion 112. Thus, an addendum side of each tooth portion 112 is smaller than a dedendum side of the tooth portion 112 in thickness.

The stepped portion 121 is formed by cutting the edge portion between the front surface 113 and top surface 118 of the tooth portion 112 into a step. The stepped portion 121 includes a longitudinal step surface 121a with a given width in the longitudinal direction of the shaft portion at a position located radially inward from the top surface 118, and a radial step surface 121b with a given width in the radial direction of the shaft portion at a position located downstream of the front surface 113 in the feeding direction.

The stepped portion 122 is formed by cutting the edge portion between the rear surface 114 and top surface 118 of the tooth portion 112 into a step. The stepped portion 122 includes a longitudinal step surface 122a with a given width in the longitudinal direction of the shaft portion at a position located radially inward from the top surface 118, and a radial step surface 122b with a given width in the radial direction of the shaft portion at a position located upstream of the rear surface 114 in the feeding direction.

In the special fluffer ring 200 configured as described above, the tooth portion 112 includes the vertical wall surface portion 116b, inclined at the inclination angle θ toward the forward side of the rotating direction. Thus, a bias force can be reduced which is exerted on the plant biomass material to be treated and which acts outward in the radial direction of the shaft portion. This allows the plant biomass material to be treated in the passage 1a in the cylinder 1 to be prevented from locally undergoing a compressive force and a frictional force to generate denser and firmer aggregates.

The prevention of generation of aggregates in turn prevents deformation of the screw shaft 7 in the radial direction of the shaft portion and a frictional force and an overmaterial to be treated caused by the contact of the tooth portion 112 with the passage 1a of the cylinder 1.

Furthermore, if the first rotator 201 and the second rotator 202 are rotated to move, in directions opposite to each other, the tooth portions 112 arranged adjacent to each other in the longitudinal direction of the shaft portion to shear the plant biomass material to be treated, the plant biomass material to be treated can be sheared by the vertical wall surface portion 116b, inclined at the inclination angle θ toward the forward side of the rotating direction. This enables a reduction in a force required to shear the plant biomass material to be treated. Therefore, a driving force required for the extruder can be reduced to allow the drive motor to be miniaturized.

Furthermore, since the tooth surface 116 of the tooth portion 112 has a helix angle shown by a phantom line T, the plant biomass material to be treated can be fed rearward in the axial direction while prevented from being significantly compressed outward in the radial direction.

Since the tooth portion 112 includes the stepped portions 121 and 122, the addendum side of the tooth portion 112 is smaller than the dedendum side thereof in thickness, and the tooth surface 116 is smaller on the addendum side of the tooth portion 112 than on the dedendum side thereof in thickness.

Thus, feeding components and a shearing force can be reduced in the outermost portion in the passage 1a, in which the plant biomass material to be treated becomes dense. This enables a reduction in the force required to shear the plant biomass material to be treated, allowing the drive motor to be miniaturized.

Furthermore, the stepped portions 121 and 122 enable a reduction in the compressive and frictional forces locally applied to the plant biomass material to be treated by the tooth portions 112. This allows the plant biomass material to be treated to be prevented from becoming denser and firmer early in the outermost portion in the passage 1a, thus preventing aggregates from being generated.

The configuration of the special fluffer ring 200 is not limited to the one according to the above-described embodiment. Various changes or combinations are possible for the configuration. For example, in the above-described embodiment, each of the tooth portions 112 of the special fluffer ring 200 includes the two stepped portions 121 and 122 by way of example. One or both of the stepped portions 121 and 122 may be omitted from the tooth portion 112. Furthermore, for example, the tooth portion 112 may include a chamfered portion 131 (read the description below of Embodiment 3 for the special gear kneader 100).

Figure 22:
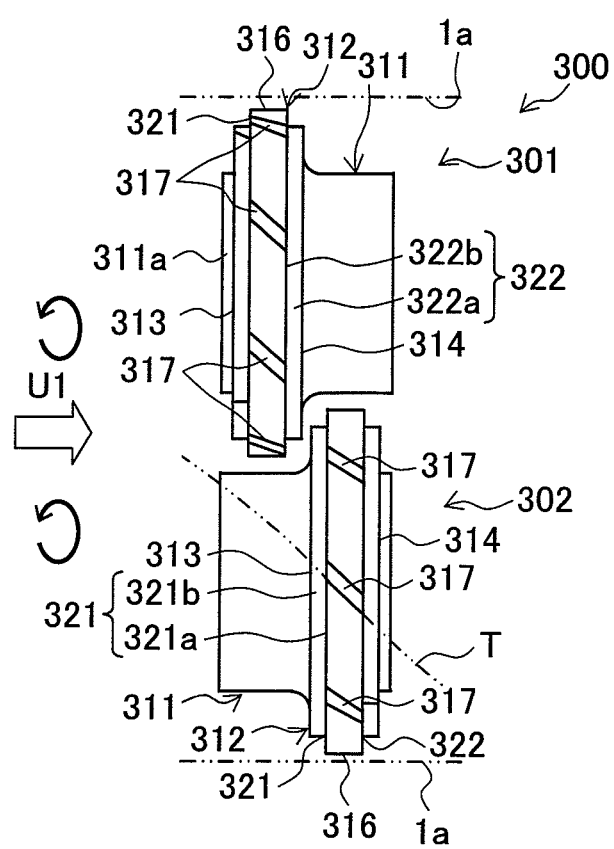
FIG. 22 is a diagram showing an example of a seal ring.
Figure 23:
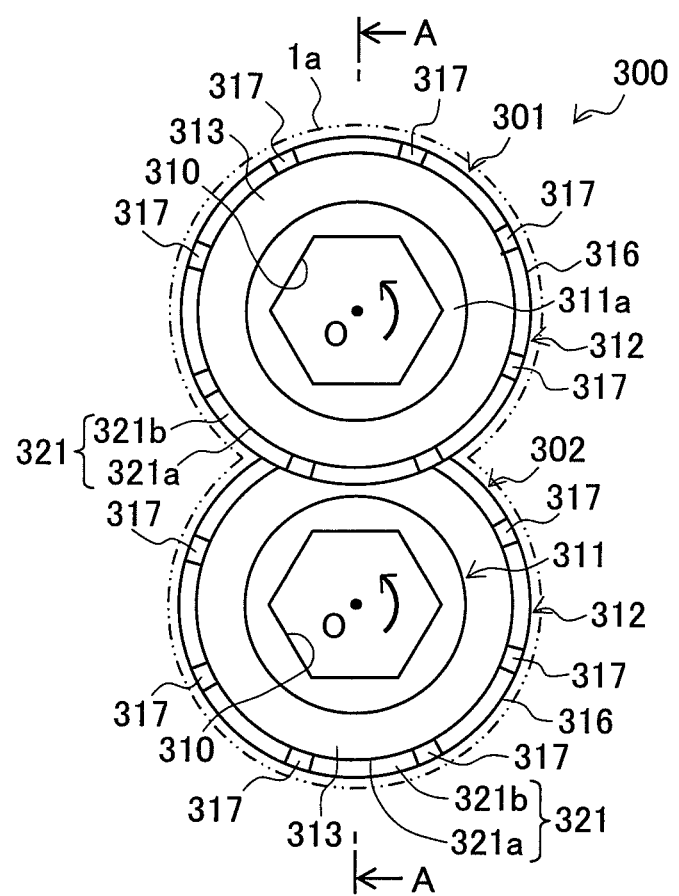
FIG. 23 is a diagram showing the seal ring in FIG. 22 as seen in the direction of arrow U1.
Figure 24:
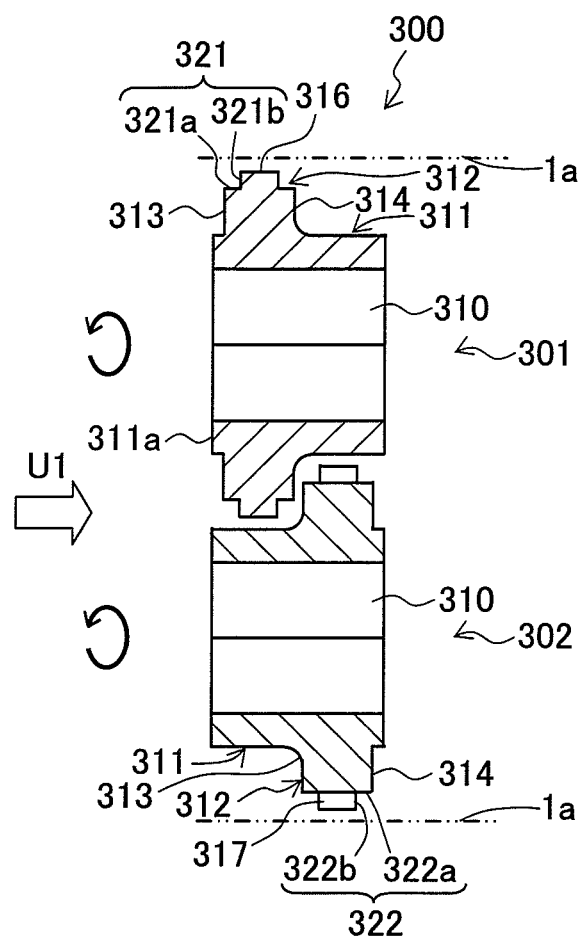
FIG. 24 is a cross-sectional view of the seal ring taken along line A-A in FIG. 23.

FIG. 22 to FIG. 24 show an example of the special seal ring 300, the seal ring according to the present invention. FIG. 22 is a diagram showing an example of the special seal ring 300. FIG. 23 is a diagram of the special seal ring 300 in FIG. 22 as seen in the direction of arrow U1, which corresponds to the feeding direction of the plant biomass material to be treated. FIG. 24 is a cross-sectional view taken along line A-A in FIG. 23.

The special seal ring 300, the seal ring according to the present invention, includes a first rotator 301 and a second rotator 302 as shown in FIG. 22 to FIG. 24. The first rotator 301 and the second rotator 302 include a cylindrical shaft portion 311 and an expanded diameter portion 312 located at one end of the shaft portion 311 and having an expanded diameter.

As shown in FIG. 22, the first rotator 301 includes the expanded diameter portion 312 on an upstream side thereof in the feeding direction, which corresponds to the front side of the shaft portion 311 in the longitudinal direction thereof, with the shaft portion 311 projecting downstream in the feeding direction, that is, toward the rear side of the shaft portion 311 in the longitudinal direction thereof. The second rotator 302 includes the expanded diameter portion 312 on a downstream side of the shaft portion 311 in the feeding direction, with the shaft portion 311 projecting upstream in the feeding direction.

The first rotator 301 and the second rotator 302 are arranged such that the expanded diameter portion 312 of the first rotator 301 lies opposite the shaft portion 311 of the second rotator 302, whereas the expanded diameter portion 312 of the second rotator 302 lies opposite the shaft portion 311 of the first rotator 301. The expanded diameter portion 312 of the first rotator 301 and the expanded diameter portion 312 of the second rotator 302 are arranged close to each other in the feeding direction.

As shown in FIG. 23, the first rotator 301 and the second rotator 302 are arranged such that the expanded diameter portions 312 partly overlap each other in the feeding direction at the intermediate position between the first rotator 301 and the second rotator 302. This ensures the capability of sealing the area between an upstream side and a downstream side of the special seal ring 300 in the feeding direction.

The first rotator 301 includes a boss portion 311a projecting from the expanded diameter portion 312 in the longitudinal direction of the shaft portion. In the second rotator 302, the shaft portion 311 is provided upstream of the expanded diameter portion 312 in the feeding direction.

The boss portion 311a of the first rotator 301 and the shaft portion 311 of the second rotator 302 serve to avoid the situation where the plant biomass material to be treated fed from the upstream side in the feeding direction collides against a front surface 313 of the expanded diameter portion 312, with the flow velocity of the plant biomass material to be treated maintained. This in turn allows the expanded diameter portion 312 to be prevented from locally rapidly undergoing a compressive force and a frictional force, thus reducing a variation in torque acting on the motor that rotationally drives the screw shaft.

As shown in FIG. 23, the shaft portion 311 includes a hexagonal through-slot 310 drilled along the central axis of the shaft portion 311. The special seal ring 300 can be rotated integrally with screw shaft 7 by fixedly inserting the screw shaft 7 through the through-slot 310.

The expanded diameter portion 312 is shaped like a short-length cylinder having a constant diameter and a predetermined axial length and extending contiguously with the shaft portion 311 in the longitudinal direction thereof. The size of the expanded diameter portion 312 is set such that an outer circumferential surface 316 of the expanded diameter portion 312 lies opposite the inner wall surface of the passage 1a with a predetermined gap between the expanded diameter portion 312 and the inner wall surface.

Lead grooves 317 are formed in the outer circumferential surface 316 of the expanded diameter portion 312. As shown in FIG. 22, the lead grooves 317 extend between the front surface 313 of the expanded diameter portion 312 and the rear surface 134 to allow an upstream side and a downstream side of the expanded diameter portion 31 to communicate with each other.

Each of the lead grooves 317 has a predetermined helix angle (lead) toward the rearward side of the rotating direction toward the downstream side in the feeding direction. In the present embodiment, the lead groove 317 is formed so as to extend along a spiral phantom line shown in FIG. 22.

In the passage 1a, the lead groove 317 allows the plant biomass material to be treated fed from the upstream side of the expanded diameter portion 312 in the feeding direction to pass through. This enables the pressure in an upstream side of the special seal ring 300 in the feeding direction to be prevented from increasing, thus preventing aggregates from being generated on the upstream side in the feeding direction.

When the first rotator 301 and the second rotator 302 rotate in the direction of arrows, the helix angle of the lead grooves 317 enables the plant biomass material to be treated to be fed to the downstream side in the feeding direction. If the lead grooves 317 have a helix angle of zero, that is, the lead grooves 317 extend parallel to the central axis of the shaft portion 311, the lead grooves' capability of feeding the plant biomass material to be treated is equal to zero. The special seal ring 300 then shears and decomposes the plant biomass material to be treated. At least one lead groove 317 is formed. In the present embodiment, as shown in FIG. 23, a total of eight lead grooves 317 are arranged at regular intervals in the circumferential direction.

The lead grooves 317 serve to disturb the flow of the plant biomass material to be treated passing between the inner wall surface of the passage 1a and the special seal ring 300 and to provide feeding components acting in the flow direction while mitigating a variation in the plant biomass material to be treated positioned upstream of the special seal ring 300. The lead grooves 317 thus has as a relief-like element for pressure and fluidity and can smoothly resist and hold the plant biomass material to be treated.

Thus, the feeding resistance that suppresses the feeding of the plant biomass material to be treated in the passage 1a in the cylinder can be stabilized to maintain the difference in pressure between the upstream side and downstream side of the special seal ring 300. Therefore, for example, the pressure in the hot compressed water treatment zone 12 formed between the resistor 31 and resistor 33 in the cylinder 1 can be maintained. This enables a variation in pressure in the hot compressed water treatment zone to be suppressed to maintain elevated temperature and elevated pressure.

Furthermore, the lead grooves 317 suppress the feeding of the plant biomass material to be treated, while allowing a part of the plant biomass material to be treated to be guided to a downstream side of the cylinder 1. This enables the pressure on the upstream side of the special seal ring 300 to be prevented from being excessively increased, in turn preventing aggregates from being generated upstream of the special seal ring 300.

Stepped portions 321 and 322 are provided on the upstream side and downstream side, respectively, of the expanded diameter portion 312 in the feeding direction. The stepped portion 321 is formed circumferentially contiguously with an edge portion between the front surface 313 and the outer circumferential surface 316. The stepped portions 322 are formed circumferentially contiguously with an edge portion between the rear surface 314 and the outer circumferential surface 316.

Each of the stepped portions 321 is formed by cutting the edge portion between the front surface 313 and outer circumferential surface 316 of the expanded diameter portion 312 into a step. The stepped portion 321 includes a longitudinal step surface 321a with a given width in the longitudinal direction of the shaft portion at a position located radially inward from the outer circumferential surface 316, and a radial step surface 321b with a given width in the radial direction of the shaft portion at a position located downstream of the front surface 313 in the feeding direction.

Each of the stepped portions 322 is formed by cutting the edge portion between the rear surface 314 and outer circumferential surface 316 of the expanded diameter portion 312 into a step. The stepped portion 322 includes a longitudinal step surface 322a with a given width in the longitudinal direction of the shaft portion at a position located radially inward from the outer circumferential surface 316, and a radial step surface 322b with a given width in the radial direction of the shaft portion at a position located downstream of the rear surface 314 in the feeding direction.

The stepped portions 321 enable a reduction in the compressive and frictional forces locally applied to the plant biomass material to be treated by the expanded diameter portion 312. This allows the plant biomass material to be treated to be prevented from becoming denser and firmer early in the outermost portion in the passage 1a, thus preventing aggregates from being generated.

Furthermore, the stepped portions 321 allow the surface area of the front surface 313 of the expanded diameter portion 312 to be reduced. As a result, a relatively weak compressive force and a relatively weak frictional force may be generated when the plant biomass material to be treated fed from the upstream side in the feeding direction comes into abutting contact with the front surface 313 of the expanded diameter portion 312. This enables a reduction in a torque required to rotate the screw shaft 7, allowing the drive motor to be miniaturized.

The configuration of the lead grooves 317 is not limited to the one according to the above-described embodiment. The number, size, and shape of the lead grooves 317 may be changed as needed to allow the relief-like element and the charging rate to be easily varied.

Embodiment 2

Figure 12:
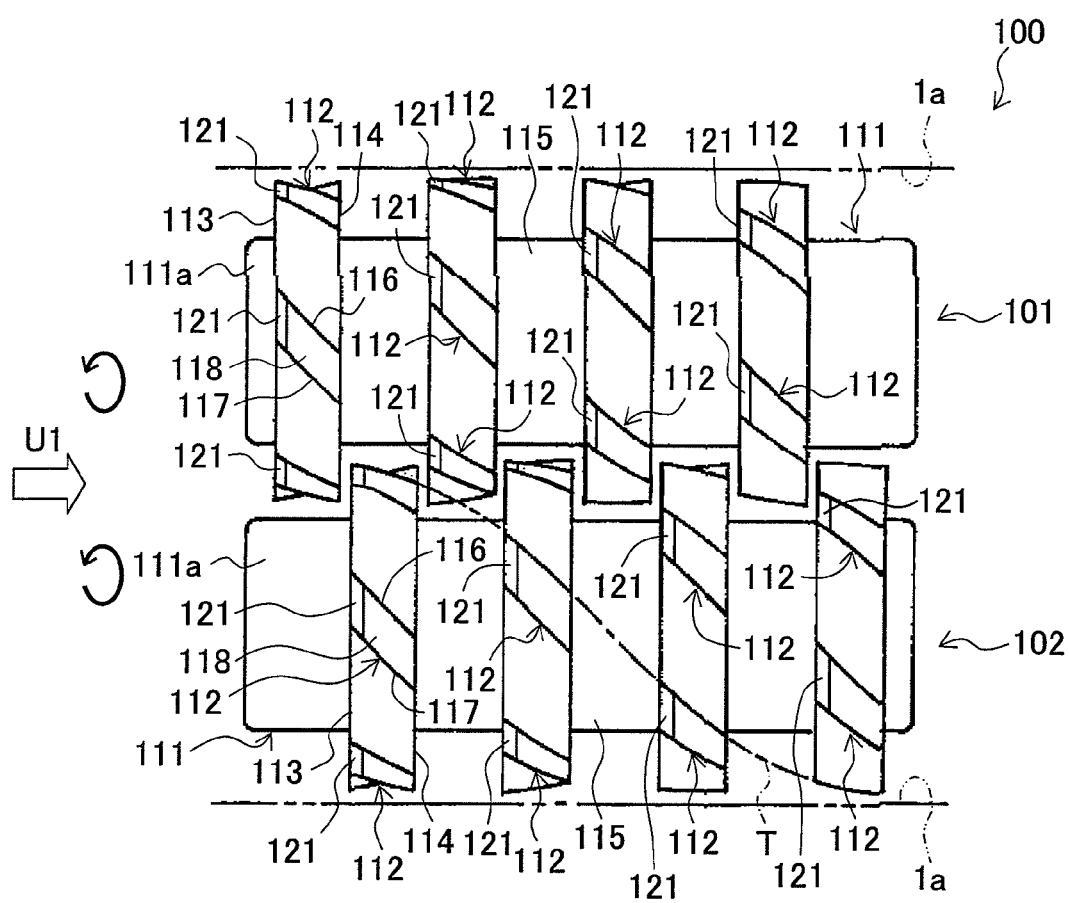
FIG. 12 is a diagram showing another example of the special gear kneader.
Figure 13:
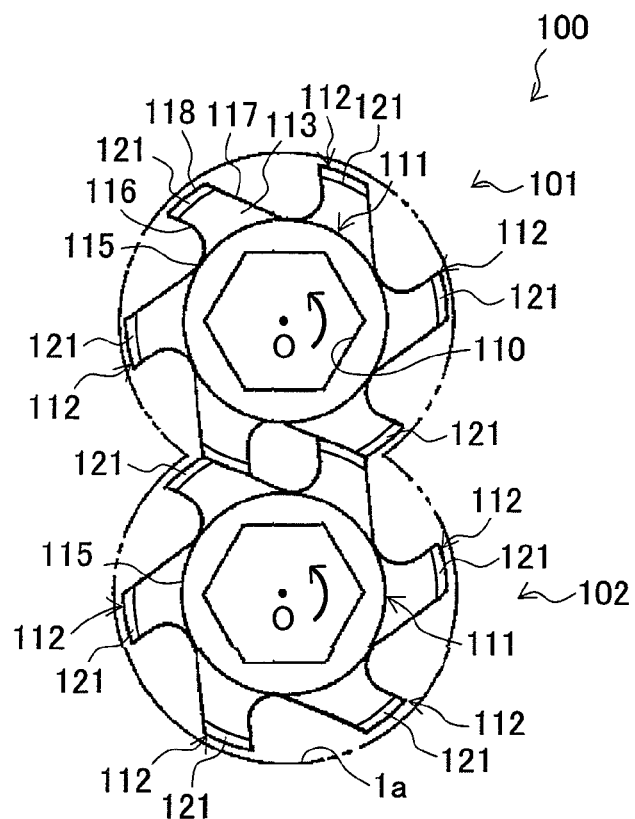
FIG. 13 is a diagram of the special gear kneader in FIG. 12 as seen in the direction of arrow U1.
Figure 14:
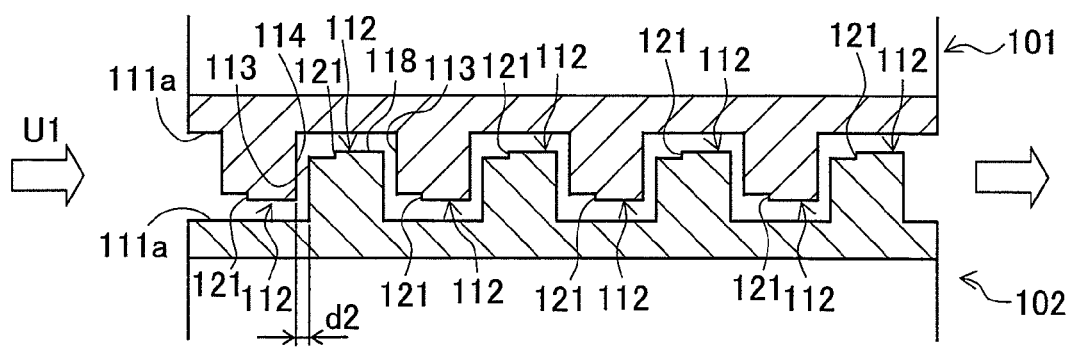
FIG. 14 is a schematic diagram showing a gear engaged state of the special gear kneader in FIG. 12, in cross section.
Figure 15:
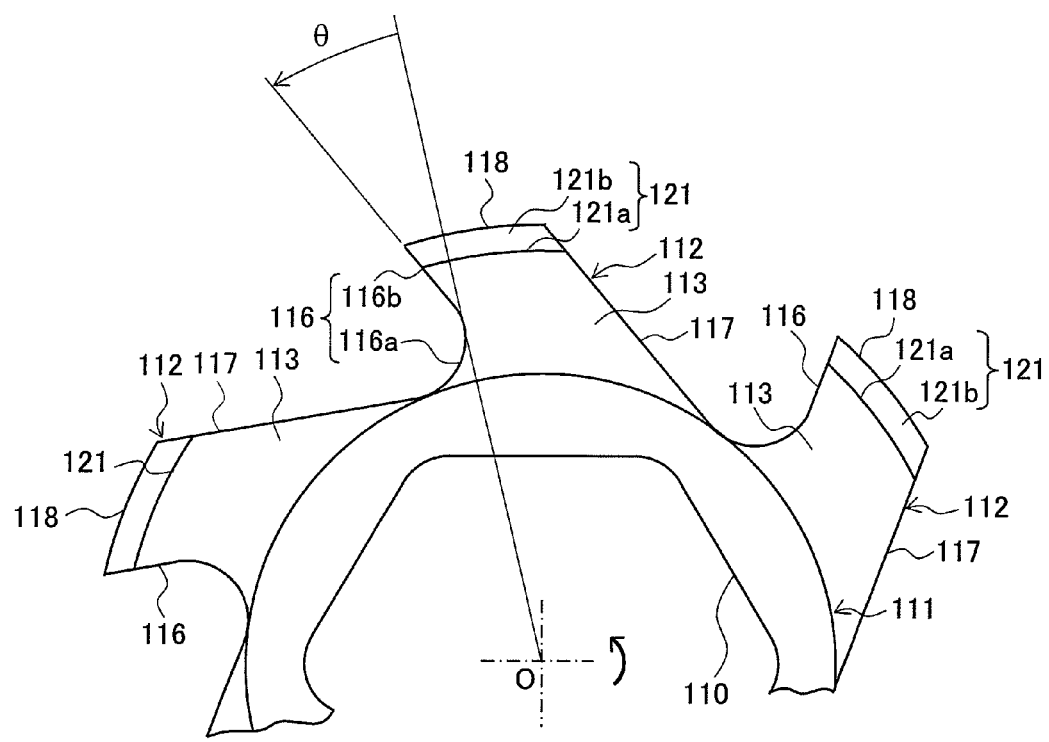
FIG. 15 is a diagram showing some of tooth portions shown in FIG. 13, in an enlarged view.

Embodiment 2 will be described with reference to FIG. 12 to FIG. 15. In embodiment 2, another example of the special gear kneader 100 will be described. FIG. 12 is a diagram showing another example of the special gear kneader. FIG. 13 is a diagram of the special gear kneader as seen in the direction of arrow U1 shown in FIG. 12. FIG. 14 is a schematic diagram showing a gear engaged state of the special gear kneader. FIG. 15 is a diagram showing some tooth portions in an enlarged view.

The special gear kneader 100 is characterized in that the stepped portion 121 is formed at the leading end portion of the tooth portion 112 as shown in FIG. 12 and FIG. 13. In the example shown in FIG. 12 to FIG. 15, the stepped portion 121 is formed in all of the six tooth portions 112 arranged on each of the first rotator 101 and the second rotator 102 in the circumferential direction of the shaft portion.

Not all the tooth portions 112 provided in the special gear kneader 100 need to include the stepped portion 121. The arrangement positions and number of and the intervals between the tooth portions 112 with the stepped portions 121 may be appropriately set according to the situation.

As shown in, for example, FIG. 12 and FIG. 13, the stepped portion 121 is formed between the tooth surfaces 116 and 117 at the edge portion between the front surface 113 and top surface 118 of the tooth portion 112. The stepped portion 122 is formed between the tooth surfaces 116 and 117 at an edge portion between the rear surface 114 and top surface 118 of the tooth portion 112. Thus, a leading end side of each tooth portion 112 is smaller than a base end side of the tooth portion 112 in thickness.

As shown in FIG. 14 and FIG. 15, the stepped portion 121 is formed by cutting the edge portion between the front surface 113 and top surface 118 of the tooth portion 112 into a step. The stepped portion 121 includes a longitudinal step surface 121a with a given width in the longitudinal direction of the shaft portion at a position located radially inward from the top surface 118, and a radial step surface 121b with a given width in the radial direction of the shaft portion at a position located downstream of the front surface 113 in the feeding direction.

The tooth portion 112 is formed such that the leading end side of the tooth portion 112 is smaller than the base end side thereof in thickness due to the stepped portion 121. This enables a reduction in feeding components and a shearing force exerted on a radially outer side in the passage 1a where the plant biomass material to be treated becomes dense. Thus, the torque required to rotate the screw shaft can be reduced to allow the drive motor to be miniaturized.

The stepped portion 121 enables a reduction in the compressive and frictional forces locally applied to the plant biomass material to be treated by the tooth portion 112. This allows the plant biomass material to be treated to be prevented from becoming denser and firmer early in the outermost portion in the passage 1a, thus preventing aggregates from being generated.

Embodiment 3

Figure 16:
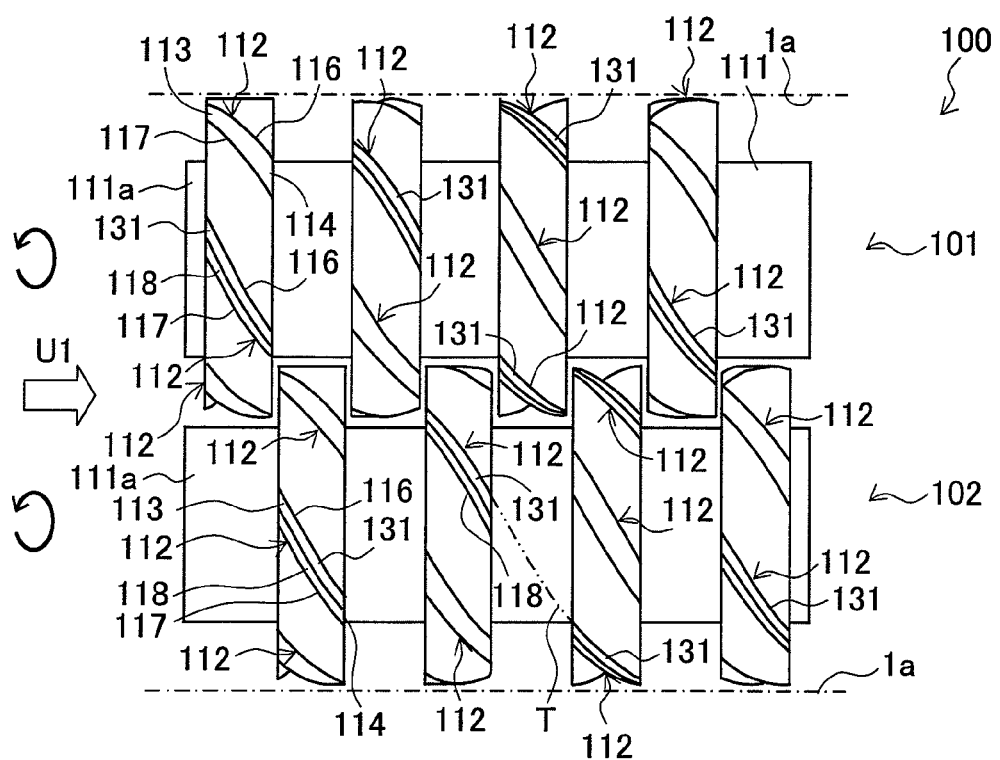
FIG. 16 is a diagram showing another example of the special gear kneader.
Figure 17:
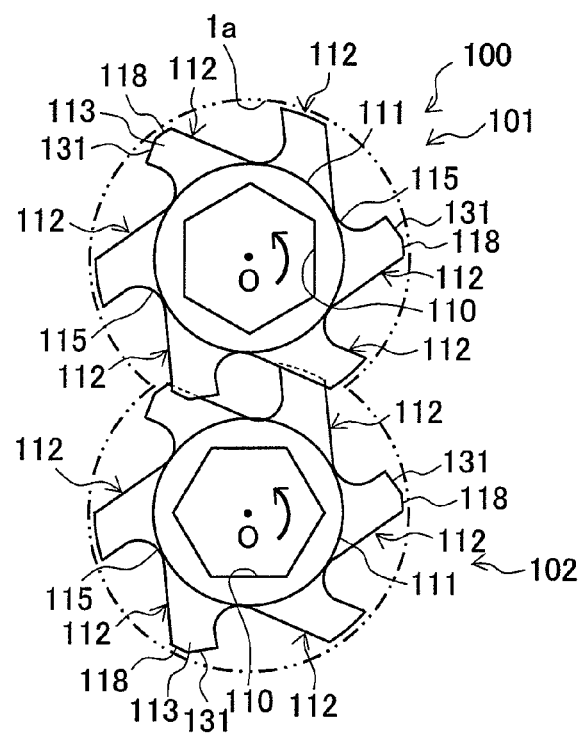
FIG. 17 is a diagram of the special gear kneader in FIG. 16 as seen in the direction of arrow U1.
Figure 18:
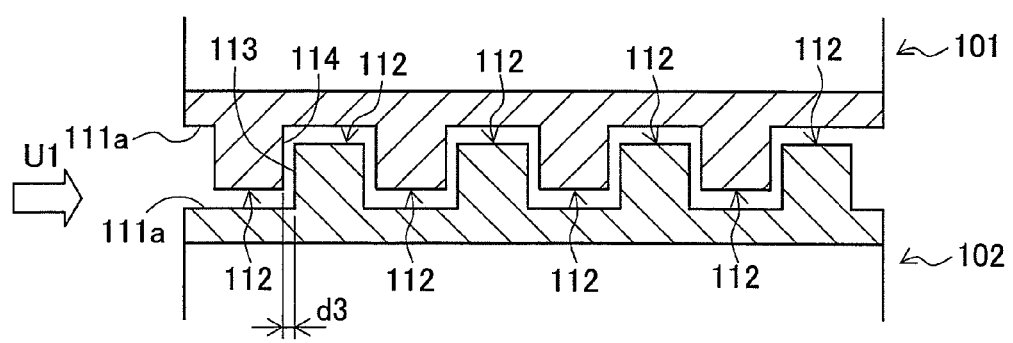
FIG. 18 is a schematic diagram showing a gear engaged state of the special gear kneader in FIG. 16, in cross section.
Figure 19:
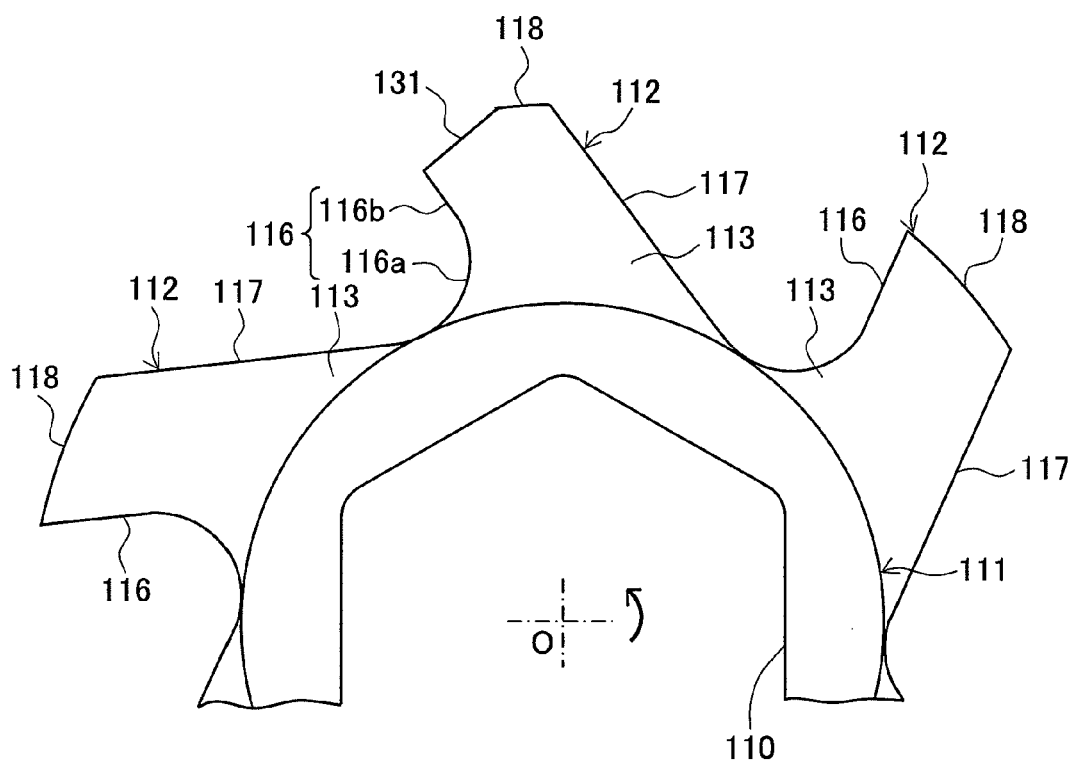
FIG. 19 is a diagram showing some of tooth portions shown in FIG. 17, in an enlarged view.

Embodiment 3 will be described with reference to FIG. 16 to FIG. 19. In embodiment 3, another example of the special gear kneader 100 will be described. FIG. 16 is a diagram showing another example of the special gear kneader. FIG. 17 is a diagram of the special gear kneader as seen in the direction of arrow U1 shown in FIG. 16. FIG. 18 is a schematic diagram showing a gear engaged state of the special gear kneader. FIG. 19 is a diagram showing some tooth portions in an enlarged view.

The special gear kneader 100 is characterized in that the tooth portion 112 includes the chamfered portion 131 formed at the leading end thereof, as shown particularly in FIG. 17 and FIG. 19. The chamfered portion 131 need not be formed in all the tooth portions 112 provided in the special gear kneader 100 but are formed in at least one of the plurality of tooth portions 112 arranged at predetermined intervals in the circumferential direction of the shaft portion. Furthermore, the chamfered portion 131 may be formed in at least one of the plurality of tooth portions 112 arranged at predetermined intervals in the longitudinal direction of the shaft portion.

The arrangement positions and number of and the intervals between the tooth portions 112 each with the chamfered portion 131 may be appropriately set according to the situation. In the example shown in FIG. 16 to FIG. 19, the chamfered portion 131 is formed in three of the six tooth portions 112 arranged in each of the first rotator 101 and the second rotator 102 in the circumferential direction of the shaft portion. The tooth portions 112 each with the chamfered portion 131 alternate with the tooth portions 112 without the chamfered portion 131.

As shown in FIG. 16 and FIG. 19, the chamfered portion 131 is formed between the front surface 113 and rear surface 114 of the tooth portion 112 at the edge portion between the tooth surface 116 and the top surface 118. The chamfered portion 131 has a planar shape inclined toward the outer side of the tooth portion in the radial direction toward the rearward side of the rotating direction.

The chamfered portion 131 is formed at the leading end portion of the tooth portion 112 and inclined toward the outer side of the tooth portion in the radial direction toward the rearward side of the rotating direction. Thus, a part of the plant biomass material to be treated which is present on the front side of the tooth portion 112 in the rotating direction can be passed between the chamfered portion 131 and the inner wall surface of the passage 1a to the rearward side of the tooth portion 112 in the rotating direction.

Furthermore, the chamfered portion 131 enables a reduction in the feeding components and shearing force exerted on the radially outer side in the passage 1a where the plant biomass material to be treated becomes dense. Thus, the torque required to rotate the screw shaft 7 can be reduced to allow the drive motor to be miniaturized.

Additionally, the chamfered portion 131 enables a reduction in the compressive and frictional forces locally applied to the plant biomass material to be treated by the tooth portion 112. This allows the plant biomass material to be treated to be prevented from becoming denser and firmer early in the outermost portion in the passage 1a, thus preventing aggregates from being generated.

As shown in FIG. 18, squared U-shaped gaps and inverted squared U-shaped gaps are formed between the first rotator 101 and the second rotator 102 contiguously in the direction of arrow U1, which corresponds to the feeding direction. The chamfered portion 131 allows the plant biomass material to be treated present on the front side of the tooth portion 112 in the rotating direction to be prevented from becoming denser and firmer. This enables a reduction in a distance d3 between the rear surface 114 of each tooth portion 112 positioned on the upstream side thereof in the feeding direction and the front surface 113 of the tooth portion 112 positioned on the downstream side thereof in the feeding direction partly opposite the rear surface 114 (d3<d1 and d3<d2). Therefore, the plant biomass material to be treated can further be pulverized between the plurality of tooth portions 112 arranged along the longitudinal direction of the shaft portion.

The configuration of the special gear kneader 100 is not limited to the contents of the above-described embodiments. Various combinations are possible for the configuration. For example, some of the tooth portions 112 may include the stepped portion 121, whereas the others may include the chamfered portion 131. Alternatively, each of the tooth portions 112 may include both the stepped portion 121 and the chamfered portion 131.

Embodiment 4

Figure 25:
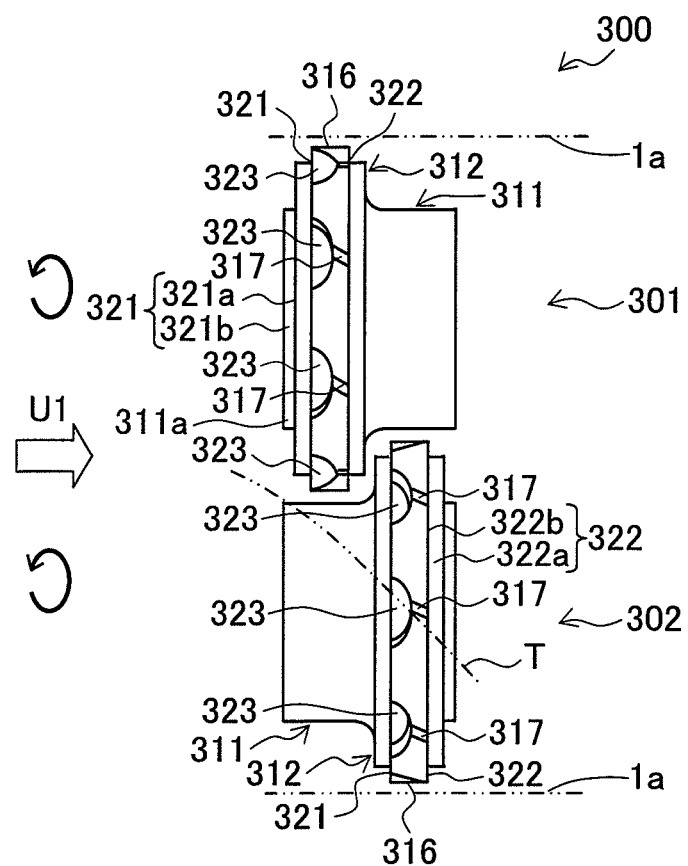
FIG. 25 is a diagram showing another example of the seal ring.
Figure 26:
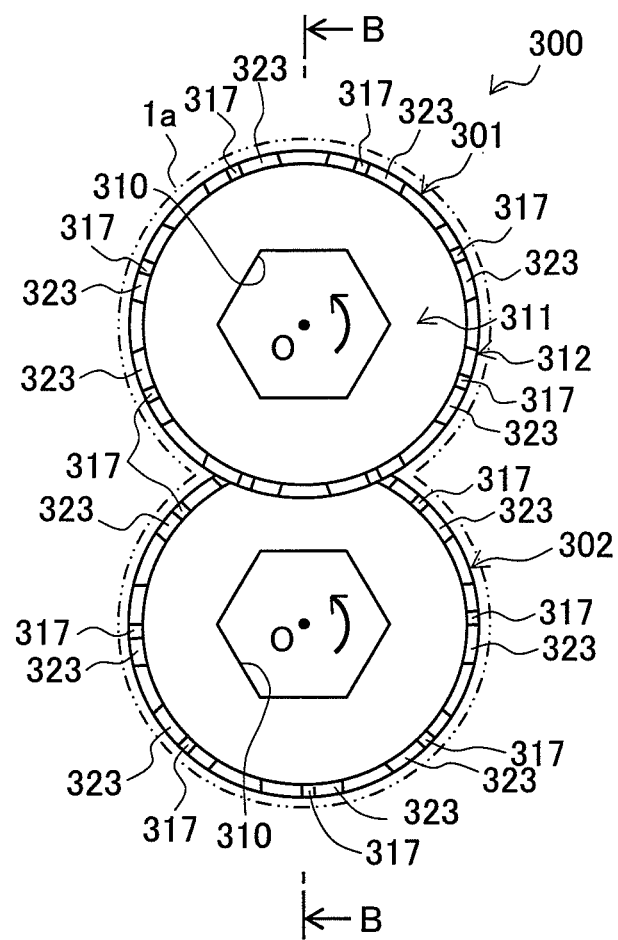
FIG. 26 is a diagram showing the seal ring in FIG. 25 as seen in the direction of arrow U1.
Figure 27:
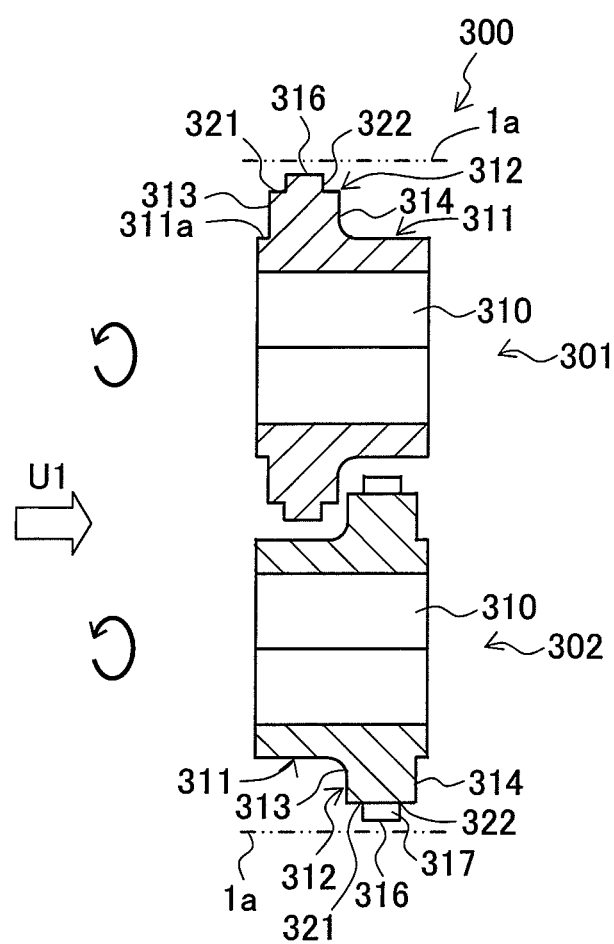
FIG. 27 is a cross-sectional view of the seal ring taken along line B-B in FIG. 26.

Embodiment 4 will be described with reference to FIG. 25 to FIG. 27. In Embodiment 4, another example of the special seal ring 300 according to the present invention will be described. FIG. 25 is a diagram showing an example of the seal ring. FIG. 26 is a diagram of the seal ring in FIG. 25 as seen in the direction of arrow U1, which corresponds to the feeding direction of the plant biomass material to be treated. FIG. 27 is a cross-sectional view of the seal ring taken along line B-B in FIG. 25.

The special seal ring 300 according to the present invention is characterized in that recessed portions 323 are formed in the outer circumferential surface 316 as shown in FIG. 25 and FIG. 26. An upstream side of each of the recessed portions 323 in the feeding direction is open forward. A downstream side of the recessed portion 323 in the feeding direction is narrower than the upstream side thereof and is shaped so as to communicate with an upstream side of the lead groove 317.

A total of eight lead grooves 317 are formed in the outer circumferential surface 316 of the outer circumferential surface 316. The recessed portions 323 are formed at positions corresponding to the respective lead grooves 317.

As shown in, for example, FIG. 26, the recessed portions 323 is similar to the lead groove 317 in depth. As shown in, for example, FIG. 25, the recessed portion 323 has a semicircle shape projecting downstream in the feeding direction from the radial step surface 321b of the stepped portion 321. The lead groove 317 is connected to a downstream end of the recessed portion 323 in the feeding direction.

The recessed portions 323 allow the plant biomass material to be treated to migrate to the outermost portion in the passage 1a while agitating a part of the plant biomass material to be treated. Thus, the flow of the plant biomass material to be treated between the special seal ring 300 and the passage 1a can further be complicated. Then, the area between the upstream side and downstream side of the special seal ring 300 can be sealed to maintain the pressure in an area formed between a seal ring 330 provided upstream in the passage 1a and a seal ring provided 330 downstream in the passage 1a.

Furthermore, since the recessed portion 323 has the semicircle shape that is narrower toward the downstream side in the feeding direction, the compressive and frictional forces are reduced which are locally applied to the plant biomass material to be treated by the outer circumferential surface 316 of the special seal ring 300. This allows the plant biomass material to be treated to be prevented from becoming denser and firmer early in the outermost portion, thus preventing aggregates from being generated.

The shape of the recessed portion 323 is not limited to the semicircle. The recessed portion 323 may have any shape provided that the shape allows the flow of the plant biomass material to be treated to be complicated. For example, an irregular shape such as a semiellipse or a triangle may be used.

Embodiment 5

Figure 28:
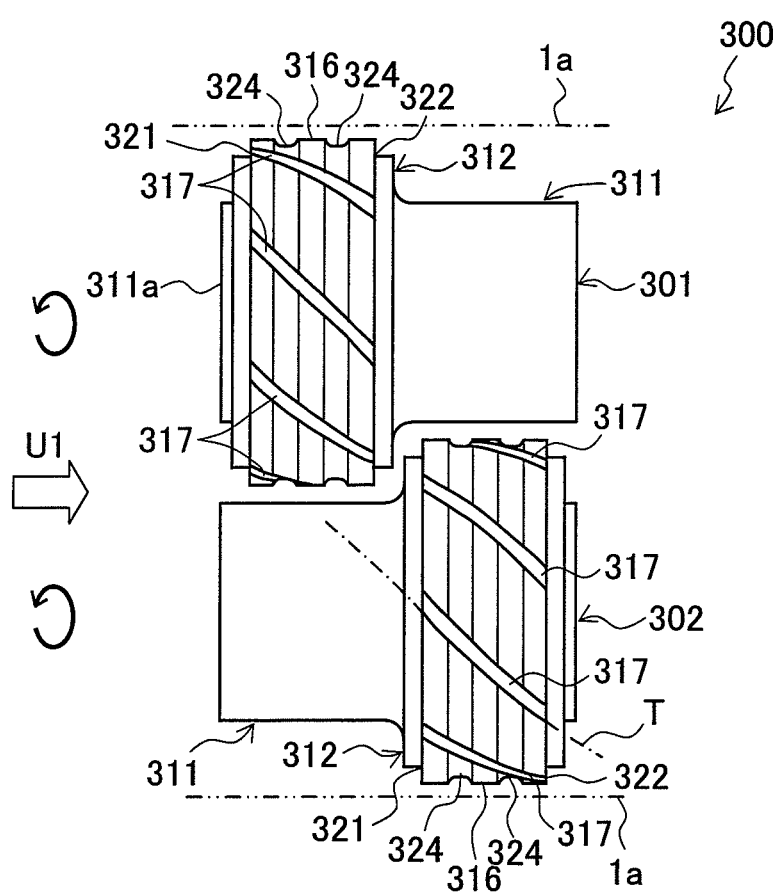
FIG. 28 is a diagram showing another example of the seal ring.
Figure 29:
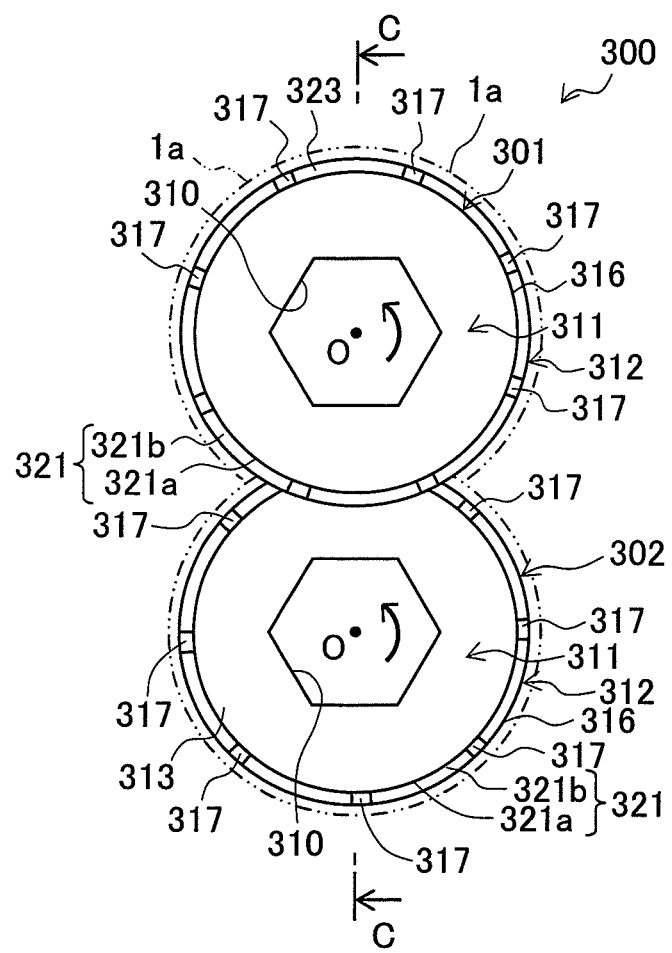
FIG. 29 is a diagram showing the seal ring in FIG. 28 as seen in the direction of arrow U1.
Figure 30:
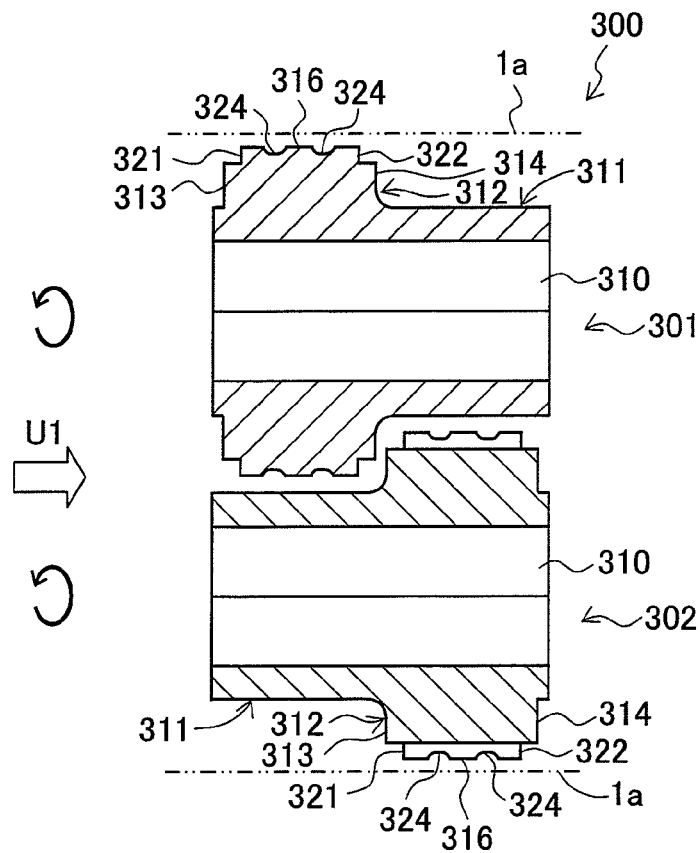
FIG. 30 is a cross-sectional view of the seal ring taken along line C-C in FIG. 29.
Figure 31:
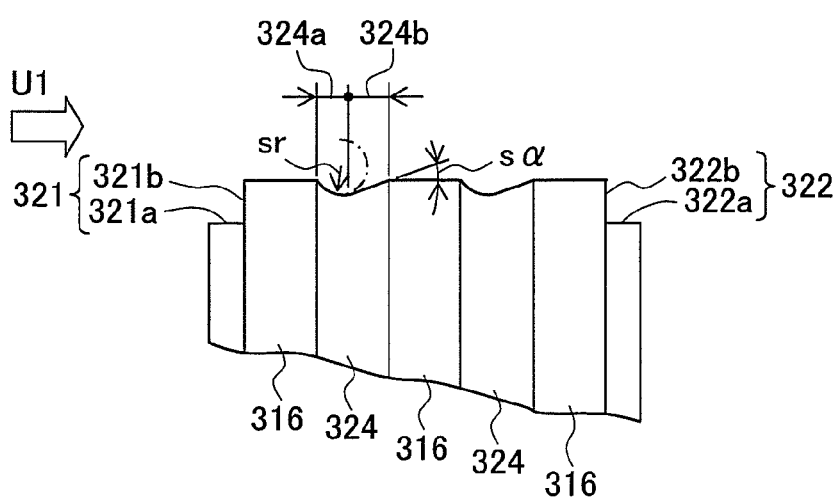
FIG. 31 is a diagram showing an essential part of the seal ring in FIG. 28 in an enlarged view.

Next, FIG. 28 to FIG. 31 show another example of the special seal ring 300. FIG. 28 is a diagram showing an example of the seal ring. FIG. 29 is a diagram of the seal ring in FIG. 28 as seen in the direction of arrow U1, which corresponds to the feeding direction of the plant biomass material to be treated. FIG. 30 is a cross-sectional view of the seal ring taken along line C-C in FIG. 29. FIG. 31 is a diagram showing an essential part of the seal ring in FIG. 28 in an enlarged view.

The special seal ring 300 according to the present invention is characterized in that at least one circumferential groove 324 is formed in the outer circumferential surface 316 of the expanded diameter portion 312. As shown in FIG. 28, the circumferential groove 324 is formed so as to extend along the circumferential direction of the outer circumferential surface 316. In the present embodiment, two circumferential grooves 324 are formed at a predetermined interval in the longitudinal direction of the shaft portion. As shown in FIG. 31, the circumferential groove 324 includes a recessed curved surface portion 324a forming an upstream portion of the circumferential groove 324 in the feeding direction and a tapered portion 324b forming a downstream portion of the circumferential groove 324 in the feeding direction.

The recessed curved surface portion 324a is formed to have a cross section shaped like a recessed circular arc with a given radius of curvature sr. The tapered portion 324b is formed to have a cross section inclined gradually at an inclination angle sa from the recessed curved surface portion 324a toward the outer side of the tooth portion in the radial direction toward the downstream side in the feeding direction.

Thus, if the plant biomass material to be treated fed from the upstream side toward the downstream side in the passage 1a migrates from a position opposite to the outer circumferential surface 316 to a position opposite to the circumferential groove 324, the recessed curved surface portion 324a of the circumferential groove 324 serves to rapidly reduce a pressure acting on the plant biomass material to be treated, thus mitigating the pressure and a variation in flow. The tapered portion 324b of the circumferential groove 324 then allows the pressure acting on the plant biomass material to be treated and the variation in flow to be gradually increased.

Then, the plurality of circumferential grooves 324 allow the pressure acting on the plant biomass material to be treated and the variation in flow to be repeatedly reduced and increased. Thus, the pressure and resistance acting on the plant biomass material to be treated in the flow direction can be smoothed, resulting in safer seal resistance (fluidity). This is particularly effective for sealing an elevated temperature and pressure area where the density of the plant biomass material to be treated is rapidly increased.

A single circumferential groove 324 or at least three circumferential grooves 324 may be formed. Furthermore, a gentle helix angle may be set for the circumferential groove 324 such that the circumferential groove 324 extends downstream in the feeding direction toward the rearward side of the rotating direction to mitigate a variation in the pressure acting on the plant biomass material to be treated.

Embodiments 6 to 8

Figure 32:
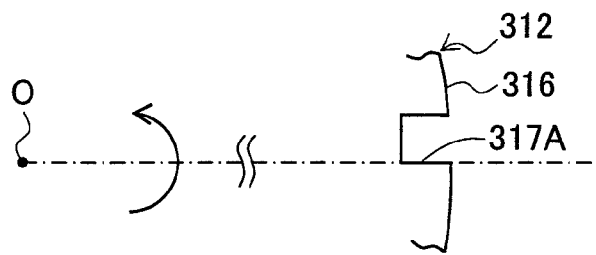
FIG. 32 is a diagram showing the cross-sectional shape of a lead groove formed in the seal ring.
Figure 33:
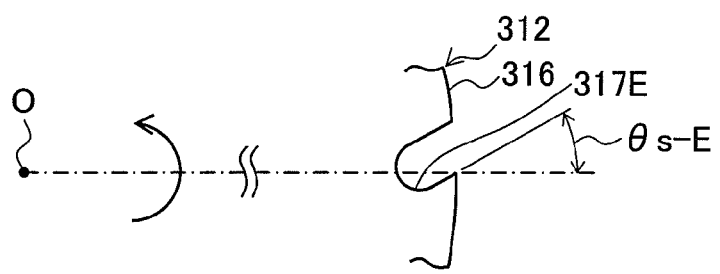
FIG. 33 is a diagram showing the cross-sectional shape of a lead groove formed in the seal ring.
Figure 34:
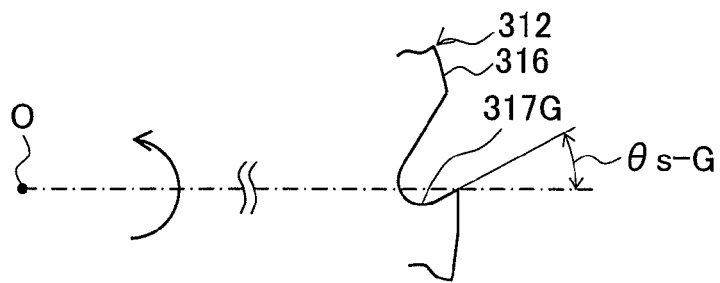
FIG. 34 is a diagram showing the cross-sectional shape of a lead groove formed in the seal ring.

FIG. 32 to FIG. 34 are diagrams showing the cross-sectional shapes of lead grooves formed in the special seal ring according to the present invention.

The special seal ring 300 according to the present invention includes a lead groove 317. The lead groove 317 is formed in the outer circumferential surface 316 of the expanded diameter portion 312. The lead groove 317 extends between the front surface 313 to rear surface 134 of the expanded diameter portion 312 to allow the upstream side and downstream side of the expanded diameter portion 312 in the feeding direction to communicate with each other.

A lead groove 317A according to Embodiment 6 shown in FIG. 32 has a cross section shaped like a substantially squared U-shaped groove and obtained by cutting the outer circumferential surface 316 along the radial direction. A lead groove 317E according to Embodiment 7 shown in FIG. 33 has a cross section shaped like a substantially U-shaped groove and obtained by cutting the outer circumferential surface 316 toward the rearward side of the rotating direction so that the groove has a predetermined angle θs-E with the radial direction. A lead groove 317G according to Embodiment 8 shown in FIG. 34 has a cross section shaped like a substantially V-shaped groove and obtained by cutting the outer circumferential surface 316 toward the rearward side of the rotating direction so that the groove has a predetermined angle θs-G with the radial direction.

The intensity of agitation carried out by the lead grooves 317A, 317E, and 317G and a feeding force exerted by the flow increase in the following order: the lead grooves 317A, 317E, and 317G (317A<317E<317G). Furthermore, the relief-like element may be optionally set depending on the conditions for and the size of the groove. The flow resistance to the plant biomass material to be treated may be varied depending on the outer diameter of the expanded diameter portion 312.

Not all the above-described screw segments need to be simultaneously used. Any of these screw segments may be selected depending on conditions or the like as needed and attached to the screw shaft 7 for use.

The embodiments have been described above in detail with reference to the drawings. However, specific configurations are not limited to these embodiments. The present invention includes changes in design and the like made without departing from the spirits of the present invention.

For example, the numbers of screw lines, helix angle, pitch, L/D, and the numbers of screws and paddles may be optionally selected as needed. Furthermore, the double-screw extruder has been described by way of example. However, the present invention is not limited to this but is applicable to an extruder with a single screw or at least three screws.

Figure 35:
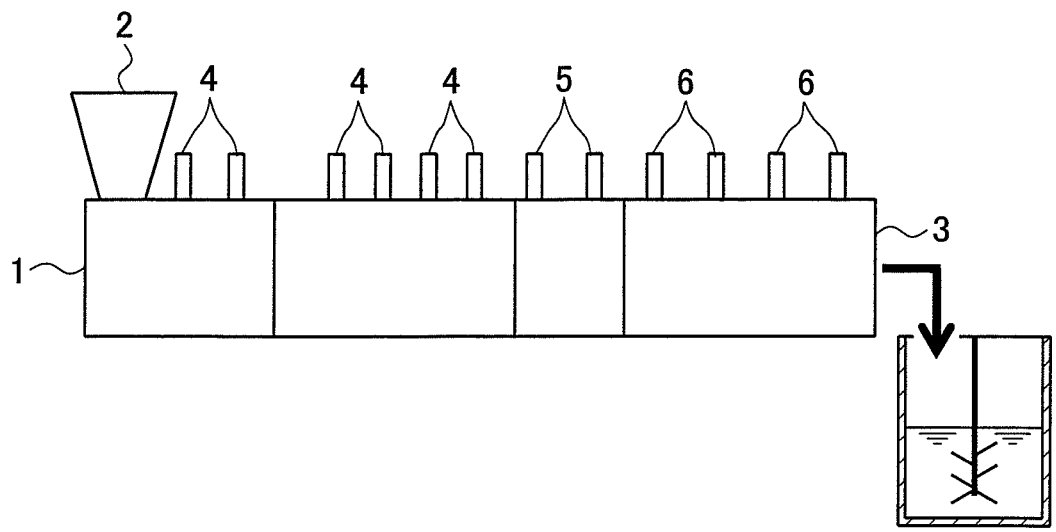
FIG. 35 is a schematic diagram showing another embodiment of the double-screw extruder according to the present invention.

FIG. 35 is a schematic diagram showing another example the double-screw extruder according to the present embodiment. The screw extruder may include a plurality of decomposing agent feed sections 4, a plurality of coolant feed sections 5, and a plurality of enzyme feed sections 6 provided on the cylinder 1 along the flow direction thereof. According to this configuration, the decomposing agent, the coolant, and the enzyme can be fed at optimum timings according to the treated state of the plant biomass material to be treated in the passage 1a.

Figure 36:
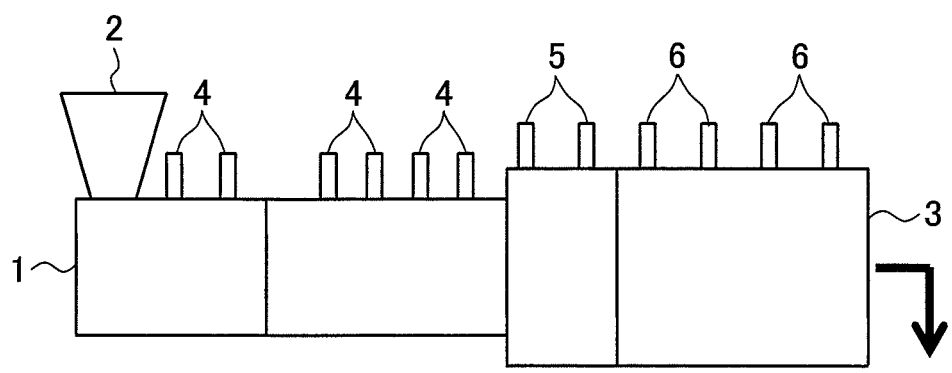
FIG. 36 is a schematic diagram showing another embodiment of the double-screw extruder according to the present invention.

Furthermore, the screw extruder may be configured such that the cylinder 1 includes an expanded diameter portion in the middle thereof as shown in FIG. 36. According to this configuration, in the downstream increased diameter portion, the flow velocity in the passage 1a can be reduced to allow a longer time for the cooling step, the saccharification preparation step, and the like.

Figure 37:
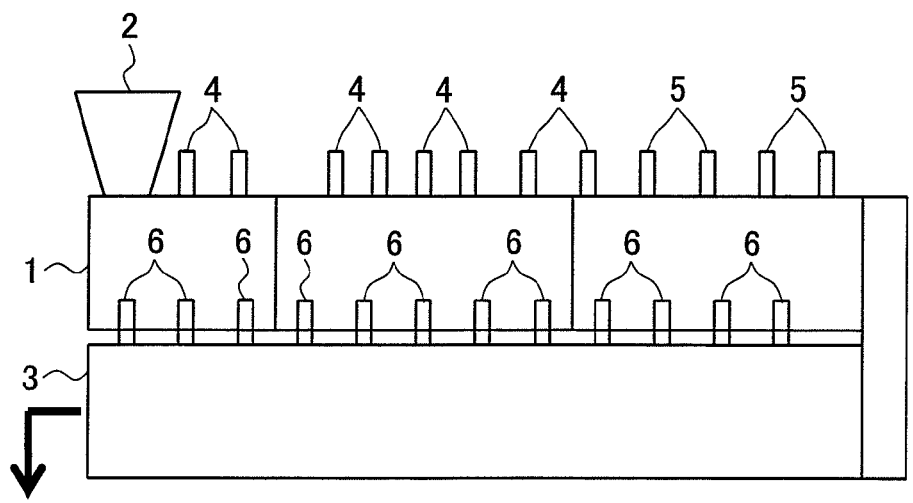
FIG. 37 is a schematic diagram showing another embodiment of the double-screw extruder according to the present invention.

Additionally, the screw extruder may be configured such that the cylinder 1 includes a turn-around portion in the middle thereof as shown in FIG. 37. According to this configuration, the length of the cylinder 1 can be increased to allow, for example, saccharification and fermentation to be carried out in an area of the cylinder 1 following the saccharification preparation zone 14.

The invention claimed is:

1. A seal ring attached to a screw shaft in a cylinder of a screw extruder so as to be rotatable integrally with the screw shaft, thus restraining a material to be treated from being fed from upstream to downstream in the cylinder, the seal ring comprising:
a shaft portion with a shaft hole through which the screw shaft is inserted,
a circular expanded diameter portion formed by expanding a diameter of the shaft portion, the expanded diameter portion comprising an outer circumferential surface opposing an inner wall surface of the cylinder with a predetermined gap therebetween;
a lead groove formed in the outer circumferential surface and extending in an axial direction of the screw shaft; and
the expanded diameter portion further comprising a front surface at an upstream end of the expanded diameter portion as viewed in a feeding direction, and a stepped portion formed at an edge portion between the outer circumferential surface and the front surface.

2. The seal ring according to claim 1, further comprising a recessed portion formed in the outer circumferential surface and which is open toward the front surface so as to have an upstream side face the feeding direction, the recessed portion being narrower on a downstream side thereof than on the upstream side thereof in the feeding direction, the downstream side of the recessed portion communicating with an upstream portion of the lead groove.

3. The seal ring according to claim 2, wherein the recessed portion has the same depth as that of the lead groove and a semicircular shape projecting downstream of a front surface of the expanded diameter portion in the feeding direction.

4. The seal ring according to claim 1, further comprising a circumferential groove formed in the outer circumferential surface of the expanded diameter portion and extending along a circumferential direction of the outer circumferential surface.

5. The seal ring according to claim 4, wherein a plurality of circumferential grooves are formed at predetermined intervals spaced apart in the feeding direction.

6. The seal ring according to claim 4, wherein each of the circumferential grooves comprises a recessed circular arc-shaped recessed curved surface portion located on an upstream side thereof in the feeding direction and having a cross-sectional shape with a predetermined radius of curvature, and
the circumferential groove further comprises an inclined tapered portion located on a downstream side of the circumferential groove in the feeding direction and having a cross-sectional shape gradually inclined at a predetermined inclination angle from the recessed curved surface toward a radially outer side of the expanded diameter portion toward the downstream side in the feeding direction.

7. The seal ring according to claim 1, wherein the lead groove has a cross section shaped like a substantially squared U-shaped groove.

8. The seal ring according to claim 1, wherein the lead groove has a cross section shaped like a substantially U-shaped or V-shaped groove in a region from the outer circumferential surface toward a bottom of the lead groove, the substantially U-shaped or V-shaped groove being obtained by cutting the outer circumferential surface toward the rearward side of the rotating direction.

\* \* \* \* \*